US012666354B2

(12) United States Patent
Kalia et al.

(10) Patent No.: US 12,666,354 B2
(45) Date of Patent: Jun. 23, 2026

(54) CPU POWER MANAGEMENT FOR VIRTUALIZED RADIO ACCESS NETWORKS

(71) Applicant: MICROSOFT TECHNOLOGY LICENSING, LLC, Redmond, WA (US)

(72) Inventors: Anuj Kalia, San Francisco, CA (US); Yu Yan, Issaquah, WA (US); Xenofon Foukas, Cambridge (GB); Bozidar Radunovic, Cambridge (GB); Nikita Lazarev, Brookline, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 429 days.

(21) Appl. No.: 18/204,343

(22) Filed: May 31, 2023

(65) Prior Publication Data

US 2024/0406860 A1 Dec. 5, 2024

(51) Int. Cl.
*H04W 52/02* (2009.01)
*H04W 72/12* (2023.01)
*H04W 72/543* (2023.01)

(52) U.S. Cl.
CPC ....... *H04W 52/0203* (2013.01); *H04W 72/12* (2013.01); *H04W 72/543* (2023.01)

(58) Field of Classification Search
CPC ....... H04W 28/0268; H04W 28/16–26; H04W 52/02; H04W 52/0203; H04W 52/0258; H04W 52/0261; H04W 52/26–265; H04W 72/12; H04W 72/543; H04W 28/00–26; H04W 52/00–60; H04W 72/00–569; Y02D 30/70
See application file for complete search history.

(56) References Cited

U.S. PATENT DOCUMENTS

2015/0334653 A1* 11/2015 Ang .................. H04W 28/0221
370/311
2019/0364492 A1* 11/2019 Azizi ................ H04W 52/0264
2022/0326757 A1* 10/2022 Sydir ................ H04W 52/0216

OTHER PUBLICATIONS

International Preliminary Report on Patentability (Chapter I) received for PCT Application No. PCT/US2024/030293, mailed on Dec. 11, 2025, 08 pages.

(Continued)

*Primary Examiner* — Ronald Eisner
(74) *Attorney, Agent, or Firm* — Tyler Thorp; Newport IP, LLC

(57) ABSTRACT

Methods and apparatuses for improving the performance and energy efficiency of Radio Access Networks (RANs) are described. Various power control schemes may dynamically adjust RAN power consumption based on fluctuations in network traffic, throughput, latency, queue sizes, and/or packet error rates with the goal of increasing energy efficiency while maintaining quality of service metrics. The power control schemes may be implemented using a PRB controller for dynamically allocating physical resource blocks (PRBs) to user devices and a CPU controller for assigning CPU power profiles based on PRB allocations for the user devices. The PRB controller and CPU controller may periodically acquire real-time telemetry data and wireless network performance information and then adjust the number of PRBs for user devices and adjust the CPU power profiles for executing RAN functions based on the telemetry data and wireless network performance information.

8 Claims, 14 Drawing Sheets

(56) References Cited

OTHER PUBLICATIONS

International Search Report and Written Opinion received for PCT Application No. PCT/US2024/030293, Sep. 5, 2024, 14 pages.

* cited by examiner

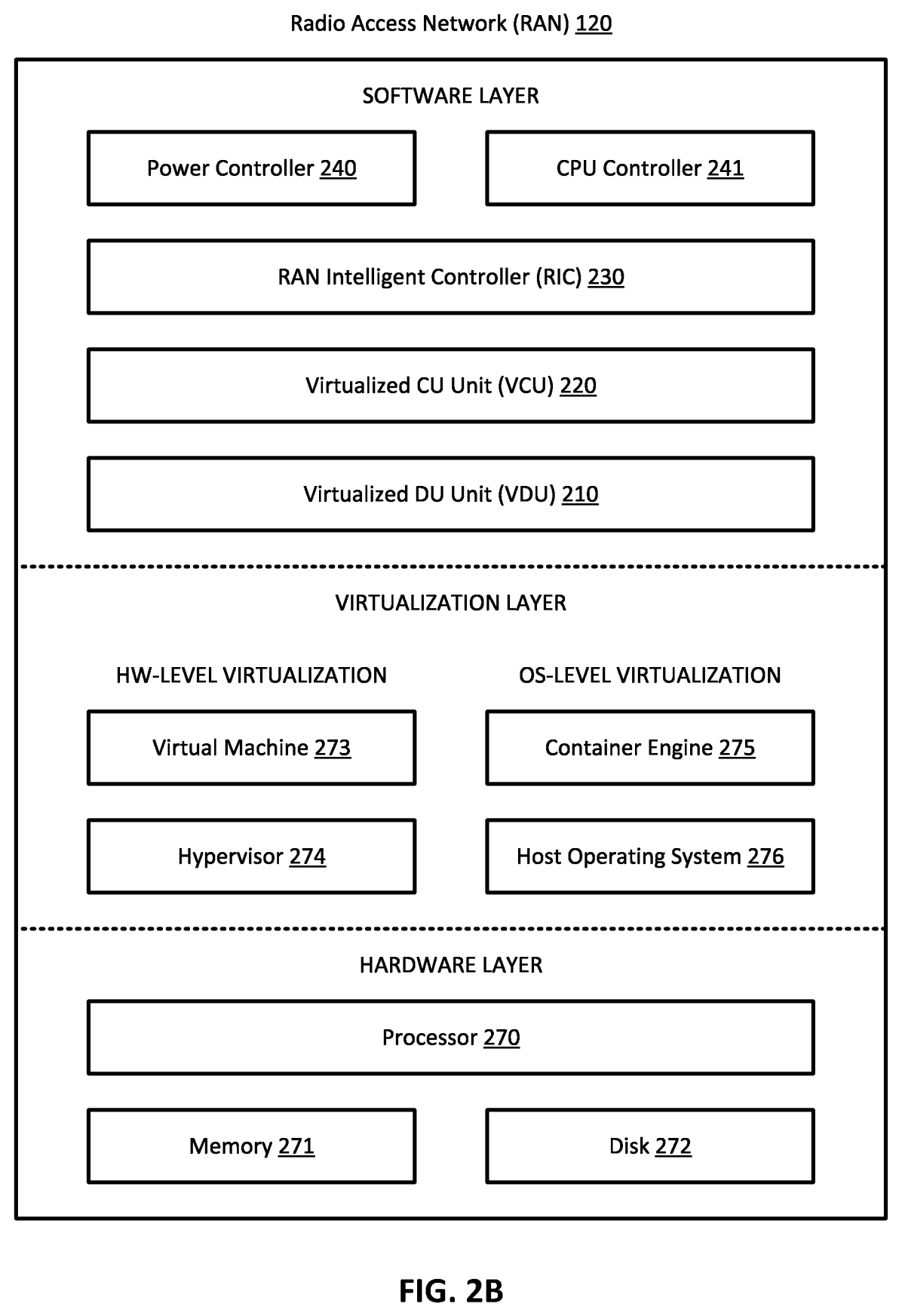

Radio Access Network (RAN) <u>120</u>

SOFTWARE LAYER

Power Controller <u>240</u>

CPU Controller <u>241</u>

RAN Intelligent Controller (RIC) <u>230</u>

Virtualized CU Unit (VCU) <u>220</u>

Virtualized DU Unit (VDU) <u>210</u>

VIRTUALIZATION LAYER

HW-LEVEL VIRTUALIZATION

Virtual Machine <u>273</u>

Hypervisor <u>274</u>

OS-LEVEL VIRTUALIZATION

Container Engine <u>275</u>

Host Operating System <u>276</u>

HARDWARE LAYER

Processor <u>270</u>

Memory <u>271</u>

Disk <u>272</u>

FIG. 2B

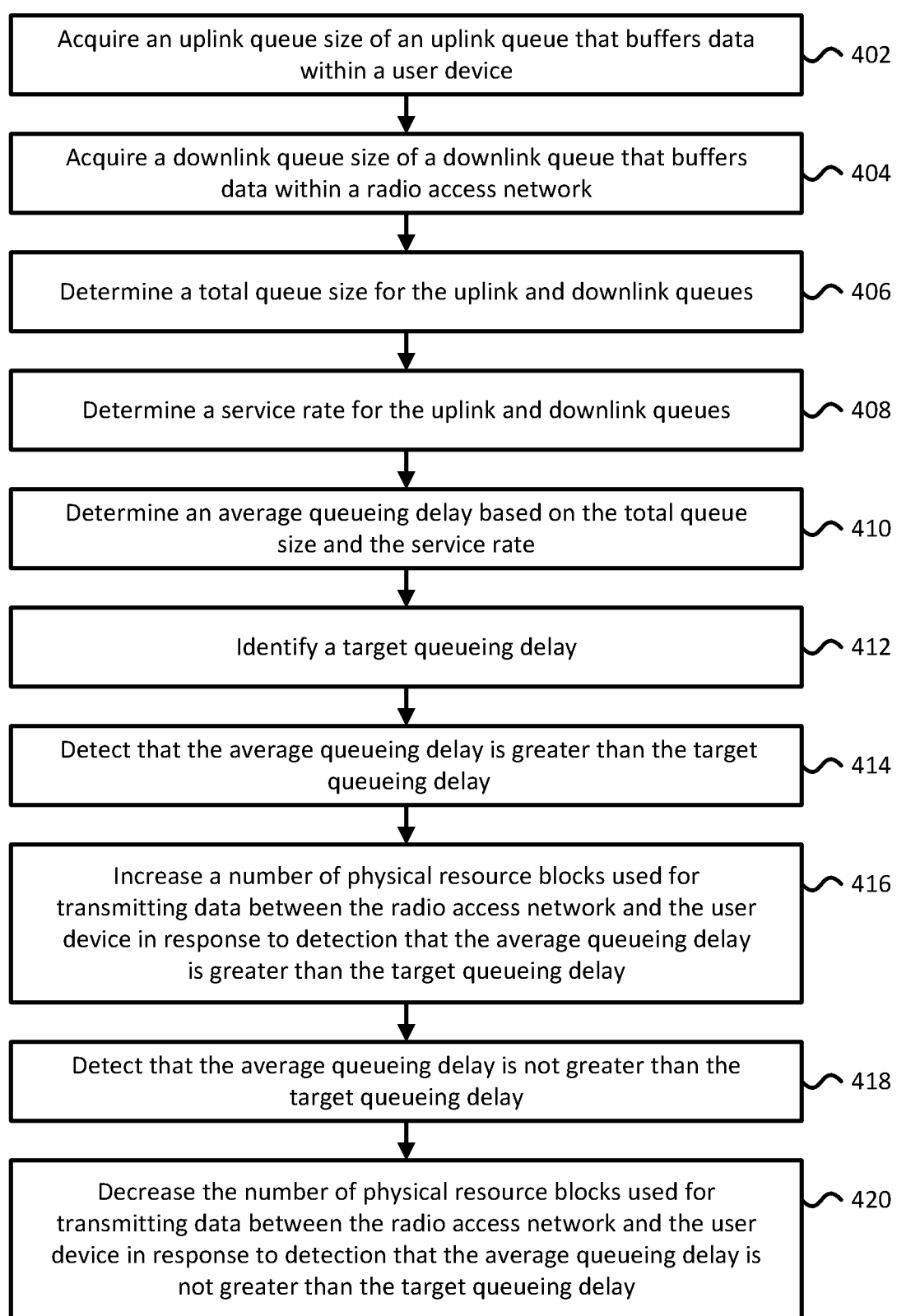

Acquire an uplink queue size of an uplink queue that buffers data within a user device    402

Acquire a downlink queue size of a downlink queue that buffers data within a radio access network    404

Determine a total queue size for the uplink and downlink queues    406

Determine a service rate for the uplink and downlink queues    408

Determine an average queueing delay based on the total queue size and the service rate    410

Identify a target queueing delay    412

Detect that the average queueing delay is greater than the target queueing delay    414

Increase a number of physical resource blocks used for transmitting data between the radio access network and the user device in response to detection that the average queueing delay is greater than the target queueing delay    416

Detect that the average queueing delay is not greater than the target queueing delay    418

Decrease the number of physical resource blocks used for transmitting data between the radio access network and the user device in response to detection that the average queueing delay is not greater than the target queueing delay    420

FIG. 4A

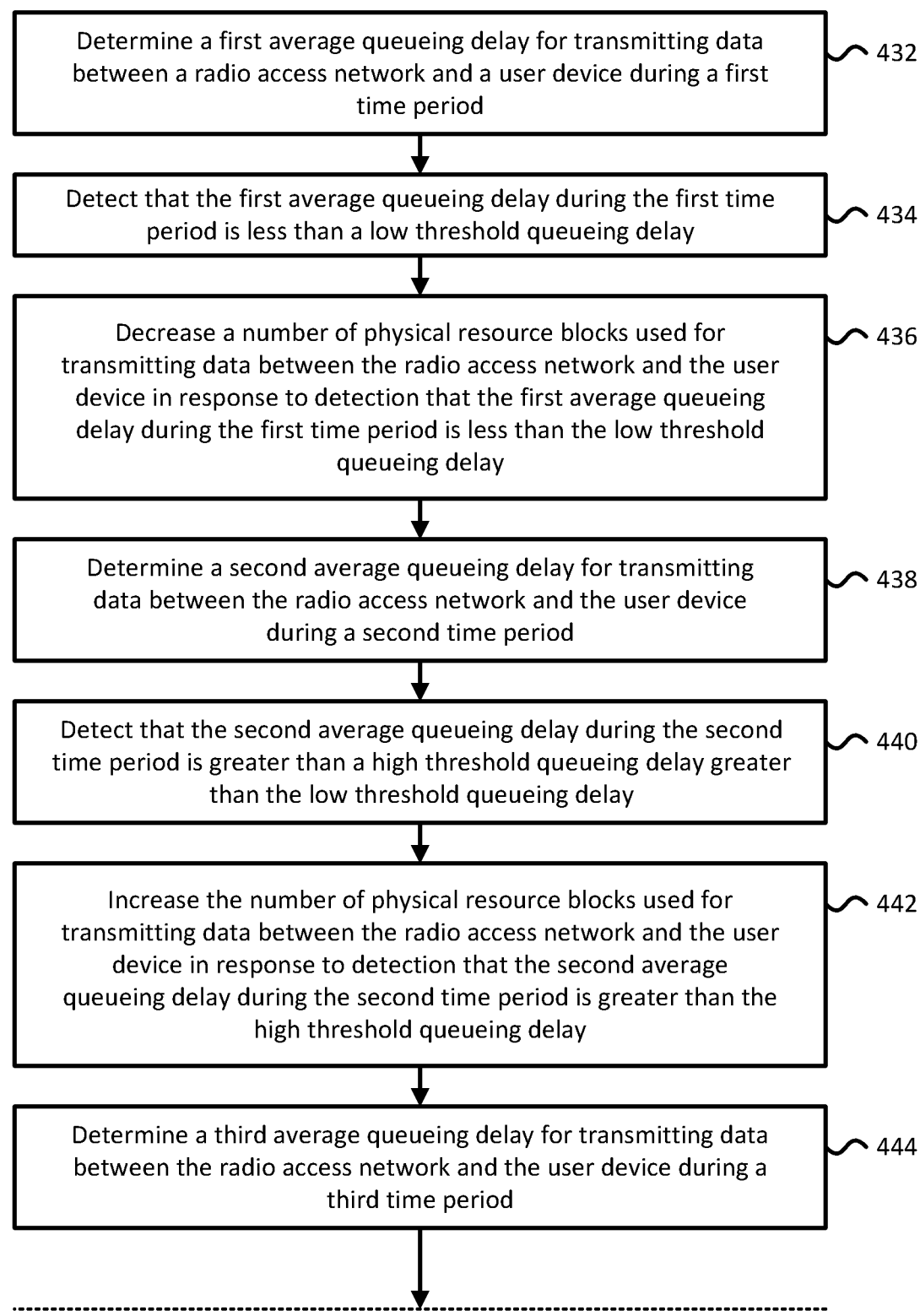

Determine a first average queueing delay for transmitting data between a radio access network and a user device during a first time period — 432

Detect that the first average queueing delay during the first time period is less than a low threshold queueing delay — 434

Decrease a number of physical resource blocks used for transmitting data between the radio access network and the user device in response to detection that the first average queueing delay during the first time period is less than the low threshold queueing delay — 436

Determine a second average queueing delay for transmitting data between the radio access network and the user device during a second time period — 438

Detect that the second average queueing delay during the second time period is greater than a high threshold queueing delay greater than the low threshold queueing delay — 440

Increase the number of physical resource blocks used for transmitting data between the radio access network and the user device in response to detection that the second average queueing delay during the second time period is greater than the high threshold queueing delay — 442

Determine a third average queueing delay for transmitting data between the radio access network and the user device during a third time period — 444

FIG. 4B

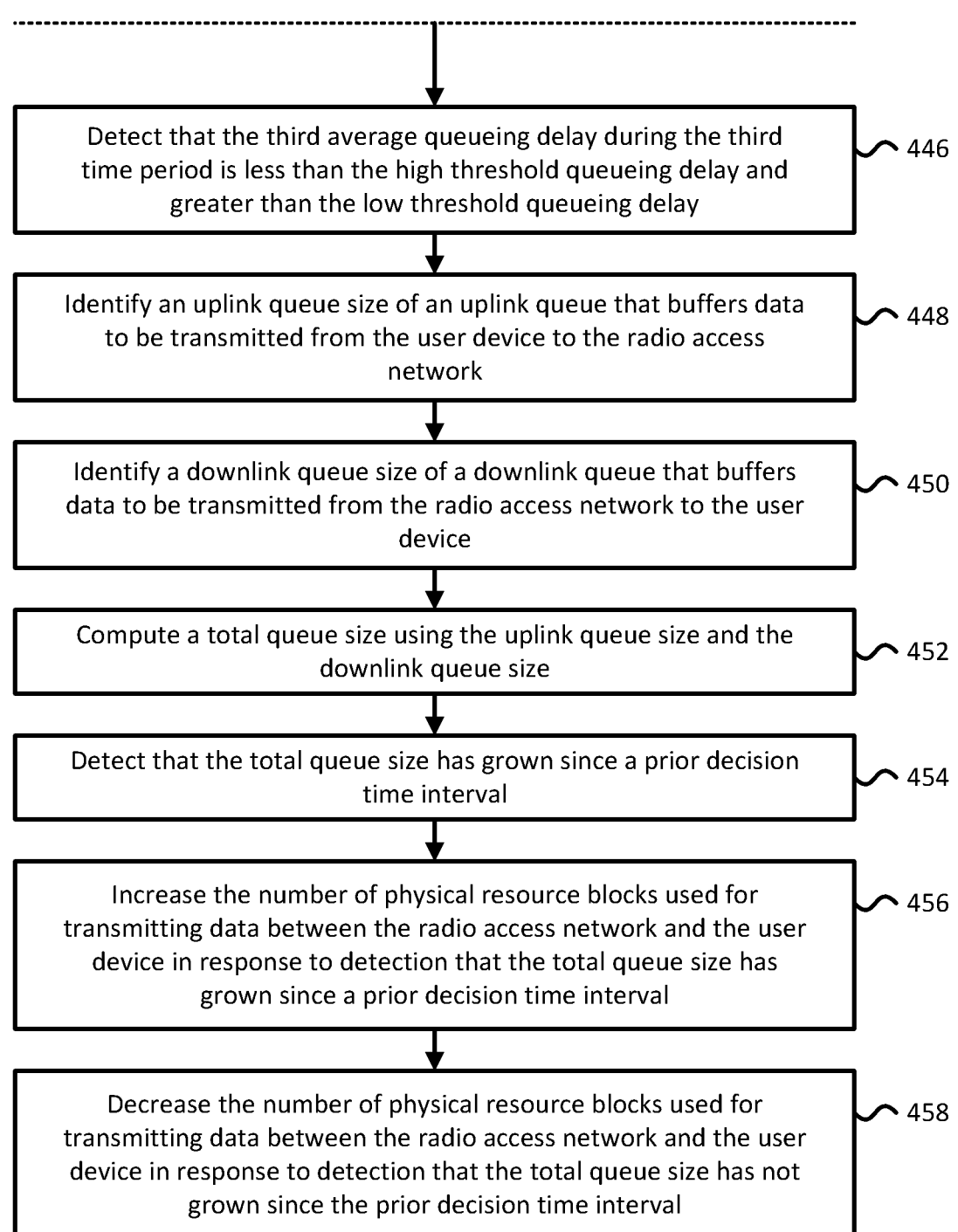

Detect that the third average queueing delay during the third time period is less than the high threshold queueing delay and greater than the low threshold queueing delay ∽ 446

Identify an uplink queue size of an uplink queue that buffers data to be transmitted from the user device to the radio access network ∽ 448

Identify a downlink queue size of a downlink queue that buffers data to be transmitted from the radio access network to the user device ∽ 450

Compute a total queue size using the uplink queue size and the downlink queue size ∽ 452

Detect that the total queue size has grown since a prior decision time interval ∽ 454

Increase the number of physical resource blocks used for transmitting data between the radio access network and the user device in response to detection that the total queue size has grown since a prior decision time interval ∽ 456

Decrease the number of physical resource blocks used for transmitting data between the radio access network and the user device in response to detection that the total queue size has not grown since the prior decision time interval ∽ 458

FIG. 4C

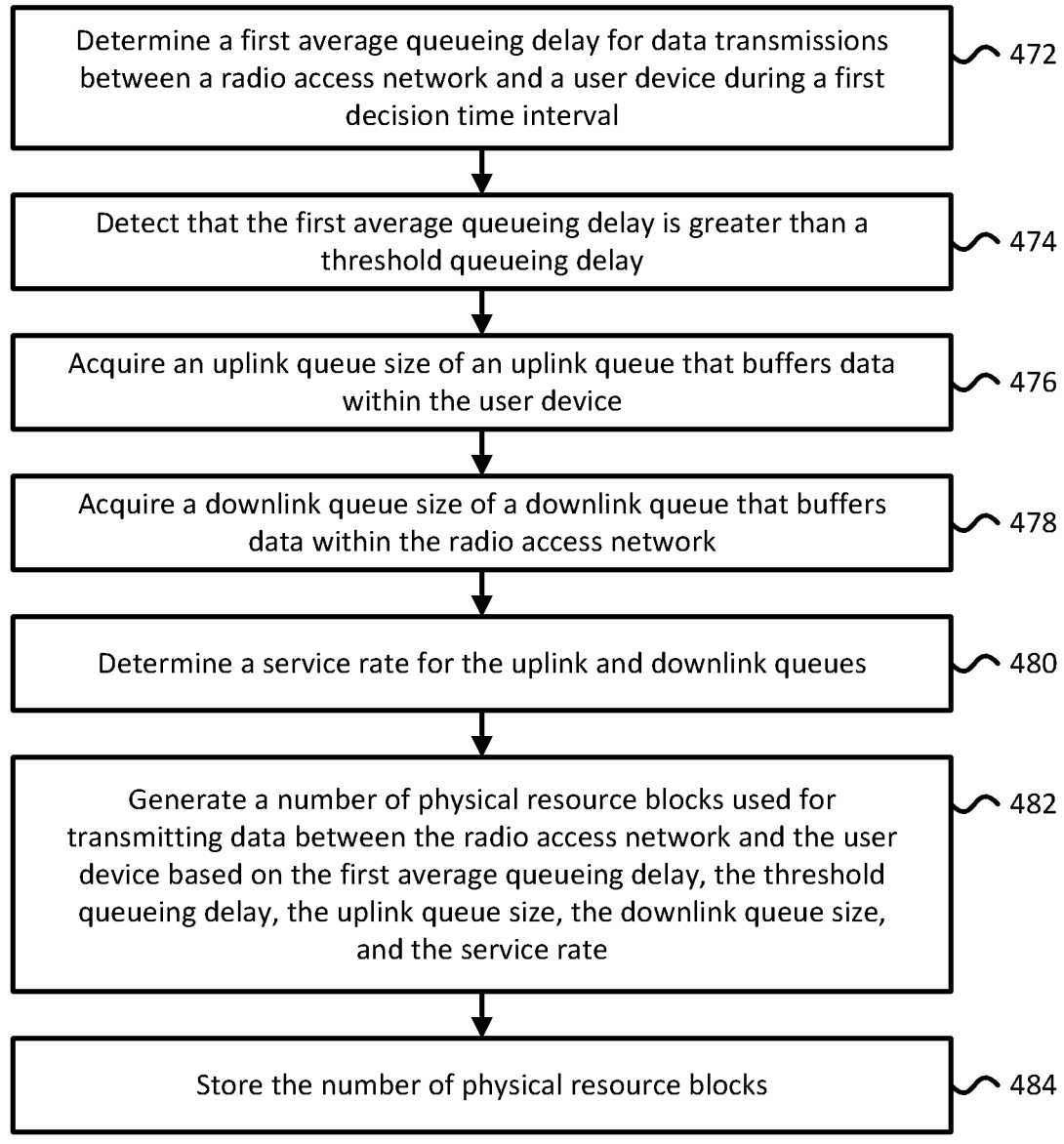

Determine a first average queueing delay for data transmissions between a radio access network and a user device during a first decision time interval ~ 472

Detect that the first average queueing delay is greater than a threshold queueing delay ~ 474

Acquire an uplink queue size of an uplink queue that buffers data within the user device ~ 476

Acquire a downlink queue size of a downlink queue that buffers data within the radio access network ~ 478

Determine a service rate for the uplink and downlink queues ~ 480

Generate a number of physical resource blocks used for transmitting data between the radio access network and the user device based on the first average queueing delay, the threshold queueing delay, the uplink queue size, the downlink queue size, and the service rate ~ 482

Store the number of physical resource blocks ~ 484

FIG. 4D

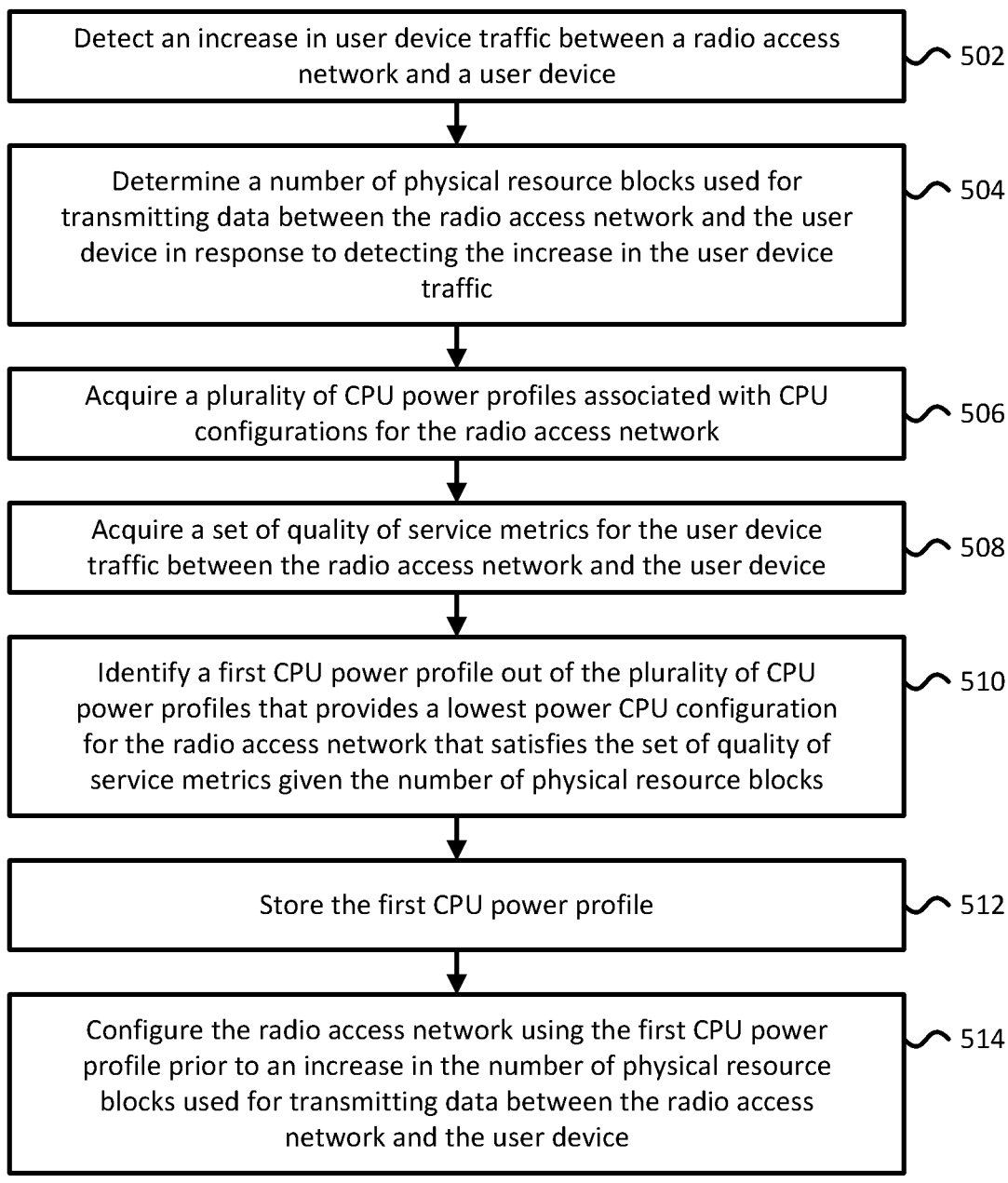

Detect an increase in user device traffic between a radio access network and a user device    502

Determine a number of physical resource blocks used for transmitting data between the radio access network and the user device in response to detecting the increase in the user device traffic    504

Acquire a plurality of CPU power profiles associated with CPU configurations for the radio access network    506

Acquire a set of quality of service metrics for the user device traffic between the radio access network and the user device    508

Identify a first CPU power profile out of the plurality of CPU power profiles that provides a lowest power CPU configuration for the radio access network that satisfies the set of quality of service metrics given the number of physical resource blocks    510

Store the first CPU power profile    512

Configure the radio access network using the first CPU power profile prior to an increase in the number of physical resource blocks used for transmitting data between the radio access network and the user device    514

FIG. 5A

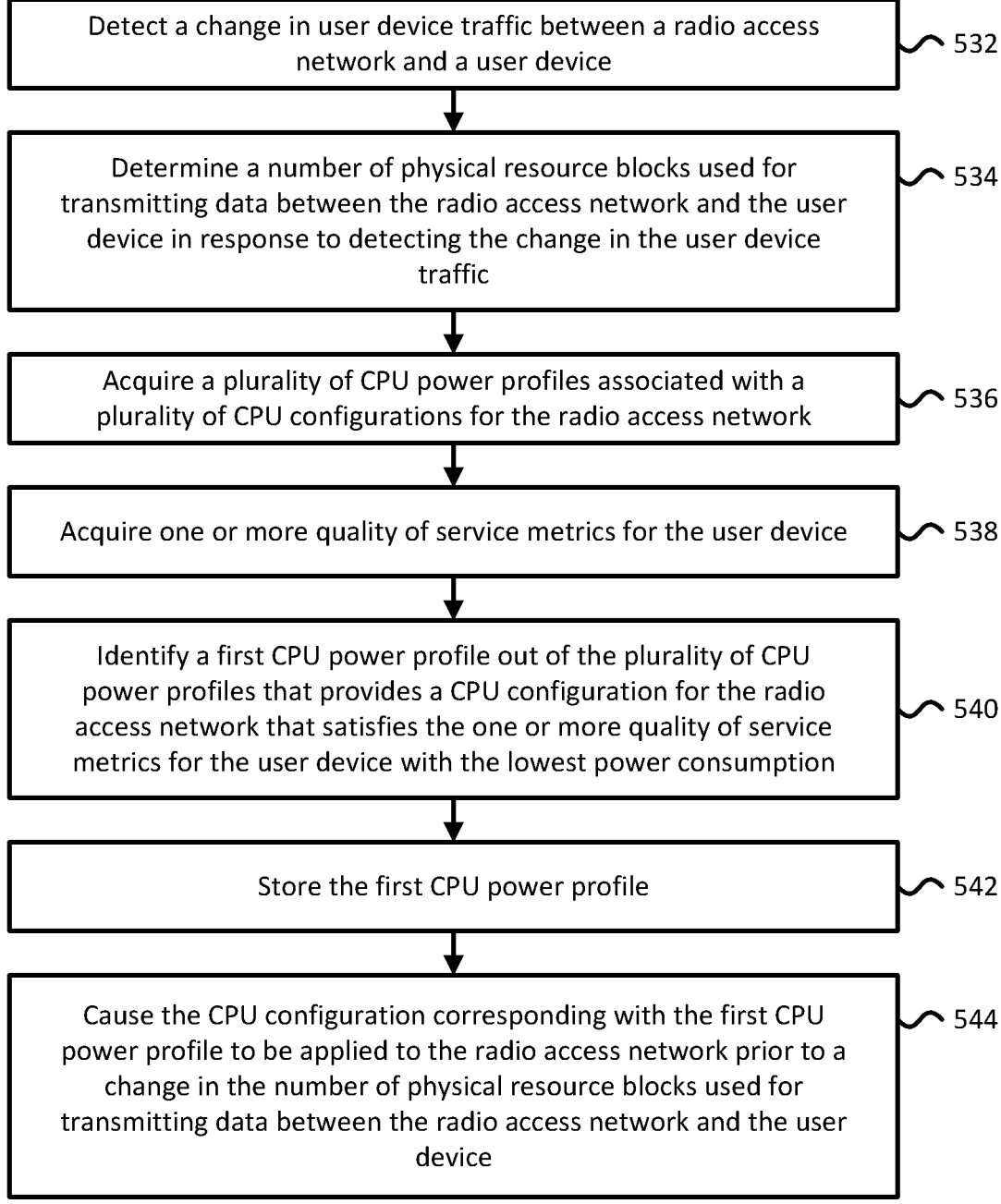

Detect a change in user device traffic between a radio access network and a user device ⟋∿ 532

Determine a number of physical resource blocks used for transmitting data between the radio access network and the user device in response to detecting the change in the user device traffic ⟋∿ 534

Acquire a plurality of CPU power profiles associated with a plurality of CPU configurations for the radio access network ⟋∿ 536

Acquire one or more quality of service metrics for the user device ⟋∿ 538

Identify a first CPU power profile out of the plurality of CPU power profiles that provides a CPU configuration for the radio access network that satisfies the one or more quality of service metrics for the user device with the lowest power consumption ⟋∿ 540

Store the first CPU power profile ⟋∿ 542

Cause the CPU configuration corresponding with the first CPU power profile to be applied to the radio access network prior to a change in the number of physical resource blocks used for transmitting data between the radio access network and the user device ⟋∿ 544

FIG. 5B

CPU POWER MANAGEMENT FOR VIRTUALIZED RADIO ACCESS NETWORKS

BACKGROUND

Next generation wireless networks have the promise to provide higher throughput, lower latency, and higher availability compared with previous global wireless standards. Fifth generation (5G) wireless networks may utilize control and user plane separation (CUPS) and multi-access edge computing (MEC), which allows compute and storage resources to be moved from a centralized cloud location to the "edges" of a network and electrically closer to end user devices and equipment, to enable low-latency applications with millisecond response times. 5G networks may leverage the use of cyclic prefix orthogonal frequency-division multiplexing (CP-OFDM) to increase channel utilization and reduce interference, the use of multiple-input multiple-output (MIMO) antennas to increase spectral efficiency, and the use of millimeter wave spectrum (mmWave) operation to increase throughput and reduce latency of data transmissions. 5G wireless user equipment (UE) may communicate over both a lower frequency sub-6 GHz band between 410 MHz and 7125 MHz and a higher frequency mmWave band between 24.25GHz and 52.6 GHz. In general, although lower frequencies may provide a lower maximum bandwidth and lower data rates than higher frequencies, lower frequencies may provide higher spectral efficiency and greater range.

BRIEF SUMMARY

Systems and methods for improving the performance and energy efficiency of Radio Access Networks (RANs) are provided. Various power control schemes may dynamically adjust RAN power consumption based on fluctuations in network traffic, throughput, latency, queue sizes, and/or packet error rates. In some cases, a RAN system may dynamically adjust the number of physical resource blocks (PRBs) allocated to a user device or network slice based on various RAN metrics including uplink queue lengths, downlink queue lengths, and/or average queuing delays. The RAN system may comprise a virtualized RAN server. The amount of adjustment in the number of PRBs allocated may depend on a difference between a targeted RAN metric (e.g., a target queueing delay) and a current RAN metric (e.g., the average queueing delay during the past 10 ms). In some cases, each PRB allocation may correspond with one PRB profile out of a discrete number of PRB profiles. For example, a PRB allocation may be selected from PRB profiles comprising 12, 20, 50, 100, 150, and 173 PRBs. Reinforcement learning techniques may be used to identify an optimum PRB profile out of a plurality of PRB profiles using historical average queueing delays, queue sizes, and service rates.

In some cases, a RAN system may dynamically assign CPU power profiles used by the RAN system to support one or more user devices and/or one or more network slices based on PRB allocations, modulation and coding schemes, and quality of service metrics for the one or more user devices and/or one or more network slices. Each CPU power profile may be associated with a number of CPU cores, corresponding CPU frequencies for each of the CPU cores, an identification of whether each CPU core is a real CPU core or a virtual CPU core (e.g., a virtualized CPU), and CPU sleep/hibernate states for each of the CPU cores in the CPU power profile. In one example, a CPU power profile out of a plurality of CPU power profiles may be selected to minimize power consumption for a RAN system that supports a first user device (e.g., a mobile phone) that has been assigned 200 PRBs and a second user device that has been assigned 50 PRBs which must both meet various quality of service metrics, such as network latency and network throughput requirements. In another example, a CPU power profile out of a plurality of CPU power profiles may be selected to minimize energy consumption for a RAN system that supports a first network slice that has been assigned 200 PRBs and a second network slice that has been assigned 50 PRBs which must both meet various quality of service metrics, such as network latency and network throughput requirements. The determination of the best CPU power profile out of a plurality of CPU power profiles may be made in real-time or using an offline profiling approach. The best CPU power profile may comprise the CPU profile that provides the lowest power consumption for the RAN system or the lowest energy consumption for the RAN system while satisfying quality of service metrics.

According to some embodiments, the technical benefits of the systems and methods disclosed herein include reduced power and energy consumption of the computing and data storage resources required for providing a telecommunications infrastructure. Other technical benefits including improved system performance and reduced cost to provide portions of a telecommunications infrastructure may also be realized through implementations of the disclosed technologies.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Like-numbered elements may refer to common components in the different figures.

FIG. 2B depicts another embodiment of a radio access network.

FIG. 4A depicts a flowchart describing one embodiment of a process for dynamically allocating physical resource blocks.

FIGS. 4B-4C depict a flowchart describing another embodiment of a process for dynamically allocating physical resource blocks.

FIG. 4D depicts a flowchart describing another embodiment of a process for dynamically allocating physical resource blocks.

FIG. 5A depicts a flowchart describing one embodiment of a process for adjusting a CPU configuration for a radio access network.

FIG. 5B depicts a flowchart describing one embodiment of a process for dynamically adjusting CPU configurations for a radio access network using CPU power profiles.

DETAILED DESCRIPTION

Figure 1A:
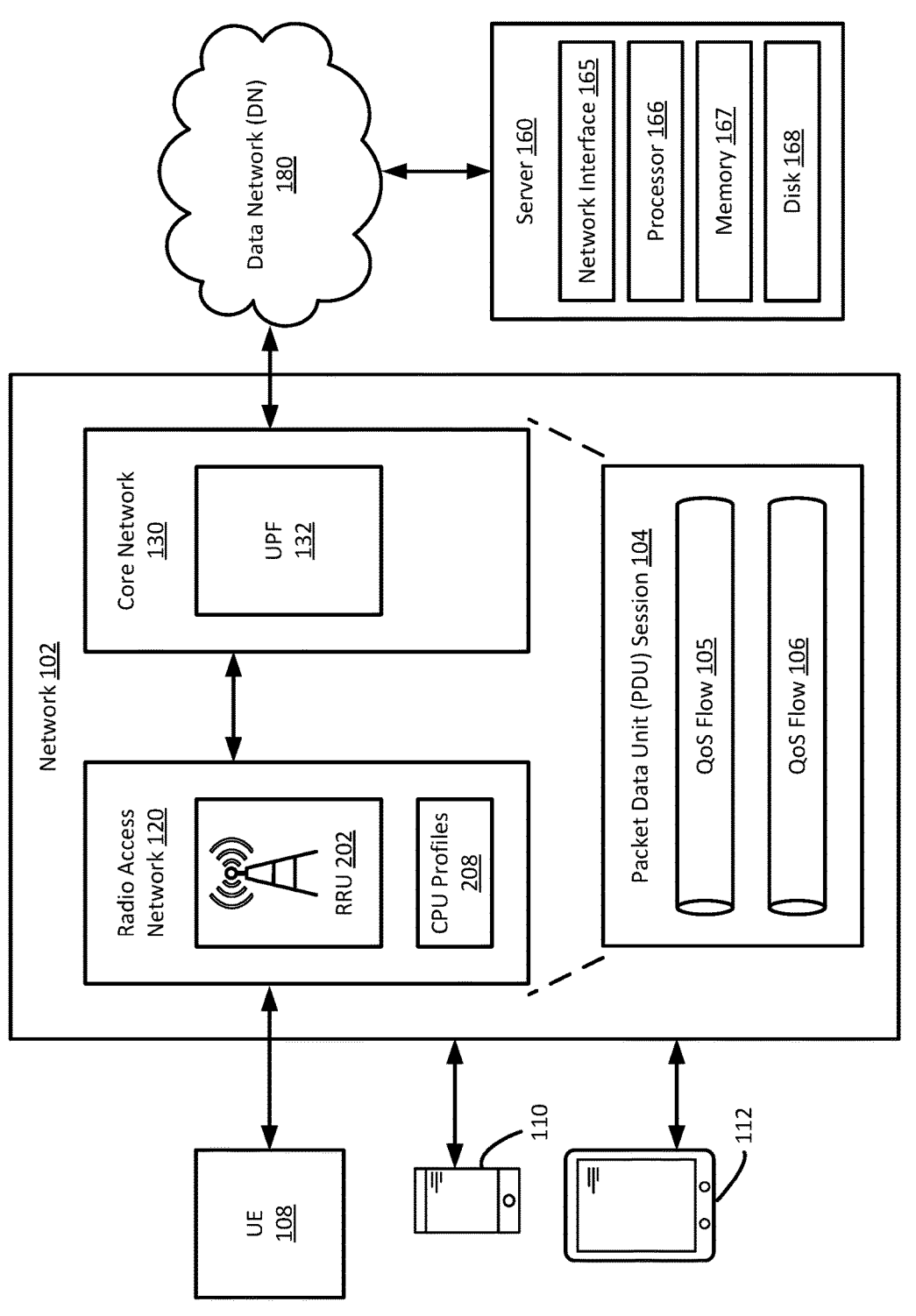
FIG. 1A depicts an embodiment of a network.

The technologies described herein provide power control schemes for energy-efficient Radio Access Networks (RANs). The power control schemes may dynamically adjust RAN power consumption based on fluctuations in network traffic, throughput, latency, and/or packet error rates with the goal of increasing energy efficiency while maintaining quality of service (QOS) metrics. The QoS metrics may include, for example, satisfying a threshold network throughput (e.g., a throughput of at least 10 Gbps) or a threshold network latency (e.g., a latency of less than 2 ms or a latency that does not exceed 2 ms). A RAN may comprise a portion of a wireless network infrastructure that converts wireless signals between user devices (or user equipment or UEs) and radio cell towers into data packets and vice versa. A virtualized RAN (vRAN) may implement RAN functionality including baseband and wireless radio functions for the wireless network infrastructure as software, which may be executed using commercial-off-the-shelf (COTS) hardware. The power control schemes may be implemented using a PRB controller for dynamically allocating physical resource blocks (PRBs) to user devices and a CPU controller for assigning CPU power profiles based on PRB allocations for the user devices. The PRB controller and the CPU controller may be in communication with various RAN components including components associated with the physical layer (PHY), medium access control (MAC) layer, and radio link control (RLC) layer.

In some embodiments, the PRB controller may determine and adjust the number of PRBs allocated to one or more user devices in real-time. The PRB controller may also allocate PRBs to different network slices used by the one or more user devices. The PRB controller may periodically acquire real-time telemetry data and real-time wireless network performance information and then adjust the number of PRBs for a user device or a network slice based on the telemetry data and wireless network performance information. The wireless network performance information may include data transmission times, throughput data rates, data error rates, uplink queue lengths, downlink queue lengths, and average queuing delays.

The length of a queue (or queue size) may refer to the number of data elements (e.g., data packets or transport blocks) in the queue. A downlink queue may be used to temporarily buffer data within a RAN to be transmitted from the RAN to the user device. An uplink queue may be used to temporarily buffer data within the user device that is to be transmitted to the RAN from the user device. The amount of data in a downlink queue that is currently queued within a RAN, such as RAN 120 in FIG. 1A, for transmission to a user device, such as UE 108 in FIG. 1A, may be determined based on the RLC buffer occupancy for the RAN. The amount of data in an uplink queue (or uplink buffer) available for transmission to the RAN may be determined based on a Buffer Status Report (BSR) from the user device.

Over time, the PRB controller may monitor downlink and uplink queue sizes used for transmitting data between the RAN and the user device and periodically (e.g., every 10 ms) compute a total queue size comprising the sum of the downlink and uplink queue sizes. During each decision time interval (e.g., every 10 ms), the PRB controller may determine an effective service rate for the downlink and uplink queues and compute an average queuing delay based on the total queue size and the effective service rate. The effective service rate may correspond with the draining speed of the queues. The average queueing delay may be computed as the total queue size divided by the effective service rate.

In some cases, the PRB controller may detect that an adjustment to the number of PRBs allocated to a user device or network slice should be adjusted (e.g., increased or decreased) in response to detection that a deviation in network traffic, an average queueing delay, and/or a total queue size has occurred. In one example, if an average queuing delay has exceeded a target queuing delay (e.g., has exceeded 1 ms), then the number of PRBs allocated to the user device or the network slice may be increased. The number of PRBs may be increased multiplicatively in proportion to the difference between the average queueing delay and the target queueing delay. However, if the average queuing delay is less than the target queuing delay, then the number of PRBs allocated to the user device or the network slice may be decreased. The number of PRBs may be decreased additively in proportion to the difference between the target queuing delay and the average queuing delay. In another example, if a total queue size has exceeded a threshold queue size (e.g., is greater than twenty transport block sizes), then the number of PRBs allocated to the user device or the network slice may be increased. The PRB controller may also periodically update PRB allocations by observing historical values for both the total queue size and the effective service rate during past time intervals and then adjusting the number of PRBs to minimize power consumption while satisfying a QoS metric such as maintaining an average network latency or a queuing delay of buffered data.

In some cases, the PRB controller may constantly decrease the number of PRBs allocated to a user device or network slice if the average queuing delay is below a low threshold queuing delay (e.g., decreasing the number of allocated PRBs by two during each decision time interval if the average queuing delay is below 0.2 ms) in order to proactively induce queuing delay and reduce power consumption. If the average queuing rate is above a high threshold queuing delay (e.g., is greater than 2 ms) greater than the low threshold queuing delay, then the PRB controller may increase the number of PRBs allocated to the user device or network slice. During a decision time interval, if the average queuing delay is between the two thresholds (e.g., is greater than the low threshold queueing delay and less than the high threshold queueing delay), then the number of PRBs allocated to the user device or network slice may be increased or decreased depending on whether the total queue size is increasing (indicating that the downlink queue or uplink queue is increasing in size). If the total queue size has increased since the previous decision time interval, then the number of allocated PRBs may be increased; otherwise, if the total queue size has decreased since the previous decision time interval, then the number of allocated PRBs may be decreased.

In some embodiments, a reinforcement learning approach may be utilized to predict the optimum number of PRBs to allocate for each decision time interval based on historical values for both the total queue size and the effective service rate during past time intervals that provides the lowest power consumption for a RAN system while still meeting QoS requirements such as maintaining an average network latency. The "state" (or input to a reinforcement learning algorithm) may comprise the historical time series for the total queue size and the effective service rate. The "action" (or output of the reinforcement learning algorithm) may comprise the number of PRBs to be allocated during each decision time interval. To reduce the dimensionality of the action space, a discrete number of PRB values or profiles may be targeted (e.g., the number of PRB allocations may be selected from 12, 20, 50, 100, 150, and 173PRBs). The "reward" function (or feedback received by the reinforcement learning algorithm) may comprise feedback from the RAN system that indicates an action's quality. The reward function may comprise a function that penalizes higher PRB allocation (corresponding with higher power consumption) and longer queuing delay. The reinforcement learning algorithm may be encoded into a neural network that is trained to learn the mapping of states to actions so as to maximize the reward function.

Technical benefits of dynamically allocating PRBs to user devices and network slices based on deviations in network traffic, average queueing delays, and/or queue sizes include that RAN energy consumption may be reduced, RAN system performance may be increased for a given power budget, and overall power consumption for implementing network slices may be reduced.

In some embodiments, a CPU controller (or CPU profile controller) may map PRB allocations, MCSs (Modulation and Coding Schemes), and QoS metrics to CPU power profiles for operating a RAN system (e.g., a vRAN server). An MCS may define the number of useful bits which can be carried by one symbol or resource element. The number of bits that each PRB carries is dependent on the MCS. The MCS may be selected based on wireless signal quality or a UE's signal-to-noise ratio (SNR). A CPU power profile may specify a number of processing cores and their respective clock frequencies or sleep states for a vRAN server. The determination of the best CPU power profile for a given set of PRB allocations, MCSs, and QoS metrics may be made in real-time or using an offline profiling approach.

Technical benefits of dynamically assigning CPU power profiles used by a RAN system based on PRB allocations, modulation and coding schemes, and quality of service metrics include a reduction in RAN system energy consumption and power consumption.

In some cases, upon detection of a burst in UE or network traffic, the CPU controller may boost CPU power before the PRB controller allocates more resource blocks and commits to a higher network throughput. In some cases, upon detection of a drop in UE or network traffic, the PRB controller may enforce a lower resource block allocation before the CPU controller safely tunes down the CPU power (e.g., by selecting a CPU power profile with lower power and performance). A technical benefit of this power control scheme is that it guarantees that no more traffic may be admitted than the capacity supported by the current CPU profile used by the RAN system.

In some embodiments, for each PRB allocation and a given MCS index, the CPU controller may exhaustively search for the optimal CPU profile with the lowest power consumption that is capable of consistently sustaining the network traffic of UEs. This CPU profile search and selection may be performed once for every model of a RAN server with a different CPU model or other hardware specs. The CPU profile search may be performed offline. The optimal CPU profiles may be encoded and/or stored in a lookup table during deployment of the CPU controller, thereby enabling safe, timely, and lightweight control of CPU power for the RAN system.

A physical resource block (or PRB) may comprise a fixed-size channel that can be allocated for transmitting or receiving data. A PRB may comprise the smallest element of resource allocation assigned by a scheduler. For a multi-carrier communication system using OFDM, a PRB may comprise the smallest unit of frequency and time resources that can be allocated for transmitting and receiving data. In some cases, a PRB may comprise a continuous OFDM symbol (e.g., seven OFDM symbols) in the time domain, and a continuous subcarrier in the frequency domain. In one example, a PRB may correspond with 12 consecutive sub-carriers for a given time slot (e.g., a 0.5 ms time slot). In other cases, a PRB may correspond with a fixed number of subcarriers (e.g., 12 subcarriers) with a subcarrier spacing (SCS), which may be a fixed spacing (e.g., to 15 kHz) or may vary.

A transmission time interval (TTI) may comprise a time unit for packeting scheduling and transmission. The TTI may be a fixed time slot (e.g., 1 ms) or may comprise a slot or fraction of a slot whose length is a function of the SCS. One technical issue with RAN implementations is that tasks may be required to be completed within strict transmission time intervals (TTIs).

FIG. 1A depicts an embodiment of a network 102 (e.g., a 5G network) including a radio access network (RAN) 120 and a core network 130. The radio access network 120 may comprise a new-generation radio access network (NG-RAN) that uses the 5G new radio interface (NR). The network 102 electrically connects user equipment (UE) to the data network (DN) 180 using the radio access network 120 and the core network 130. The user equipment in communication with the radio access network 120 includes UE 108, mobile phone 110, and mobile computing device 112. The data network 180 may comprise the Internet, a local area network (LAN), a wide area network (WAN), a private data network, a wireless network, a wired network, or a combination of networks. The data network 180 may connect to or be in communication with server 160.

A server, such as server 160, may allow a client device, such as the mobile computing device 112, to download information or files (e.g., executable, text, application, audio, image, or video files) from the server. The server 160 may comprise a hardware server or a virtual server. In some cases, the server 160 may act as an application server or a file server. In general, a server may refer to a hardware device that acts as the host in a client-server relationship or to a software process that shares a resource with or performs work for one or more clients. The server 160 includes a network interface 165, processor 166, memory 167, and disk 168 all in communication with each other. Network interface 165 allows server 160 to connect to data network 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs, one or more GPUs, and/or one or more NPUs. Memory 167 may comprise one or more types of memory (e.g., RAM, SRAM, DRAM, EEPROM, Flash, etc.). Disk 168 may include a hard disk drive and/or a solid-state drive. Memory 167 and disk 168 may comprise hardware storage devices.

The UE 108 may comprise an electronic device with wireless connectivity or cellular communication capability, such as a mobile phone or handheld computing device. In one example, the UE 108 may comprise a smartphone or a cellular device that connects to the radio access network 120 via a wireless connection. The UE 108 may comprise one of a plurality of UEs not depicted that are in communication with the radio access network 120. The UEs may include mobile and non-mobile computing devices. The UEs may include laptop computers, desktop computers, Internet-of-Things (IoT) devices, and/or any other electronic computing device that includes a wireless communications interface to access the radio access network 120.

The radio access network 120 includes a remote radio unit (RRU) 202 for wirelessly communicating with UE 108. The RRU 202 may comprise a radio unit (RU) and may include one or more radio transceivers for wirelessly communicating with UE 108. The RRU 202 may include circuitry for converting signals sent to and from an antenna of a base station into digital signals for transmission over packet networks. The radio access network 120 may correspond with a 5G radio base station that connects user equipment to the core network 130. The 5G radio base station may be referred to as a generation Node B, a "gNodeB," or a "gNB." A base station may refer to a network element that is responsible for the transmission and reception of radio signals in one or more cells to or from user equipment, such as UE 108.

A control plane (CP) may comprise a part of a network that controls how data packets are forwarded or routed. The control plane may be responsible for populating routing tables or forwarding tables to enable data plane functions. A data plane (or forwarding plane) may comprise a part of a network that forwards and routes data packets based on control plane logic. Control plane logic may identify packets to be discarded and packets to which a high quality of service should apply.

The core network 130 may utilize a cloud-native service-based architecture (SBA) in which different core network functions (e.g., authentication, security, session management, and core access and mobility functions) are virtualized and implemented as loosely coupled independent services that communicate with each other, for example, using HTTP protocols and APIs. In some cases, control plane functions may interact with each other using the service-based architecture. In some cases, a microservices-based architecture in which software is composed of small independent services that communicate over well-defined APIs may be used for implementing some of the core network functions. For example, control plane network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

In some cases, the primary core network functions may comprise the access and mobility management function (AMF), the session management function (SMF), and the user plane function (UPF). A UPF (e.g., UPF 132) may perform packet processing including routing and forwarding, quality of service (QoS) handling, and packet data unit (PDU) session management. The UPF may serve as an ingress and egress point for user plane traffic and provide anchored mobility support for user equipment. For example, the UPF 132 may provide an anchor point between the UE 108 and the data network 180 as the UE 108 moves between coverage areas. An AMF may act as a single-entry point for a UE connection and perform mobility management, registration management, and connection management between a data network and UE. An SMF may perform session management, user plane selection, and IP address allocation.

Other core network functions may include a network repository function (NRF) for maintaining a list of available network functions and providing network function service registration and discovery, a policy control function (PCF) for enforcing policy rules for control plane functions, an authentication server function (AUSF) for authenticating user equipment and handling authentication related functionality, a network slice selection function (NSSF) for selecting network slice instances, and an application function (AF) for providing application services. Application-level session information may be exchanged between the AF and PCF (e.g., bandwidth requirements for QoS). In some cases, when user equipment requests access to resources, such as establishing a PDU session or a QoS flow, the PCF may dynamically decide if the user equipment should grant the requested access based on a location of the user equipment.

A network slice may comprise an independent end-to-end logical communications network that includes a set of logically separated virtual network functions. Network slicing may allow different logical networks or network slices to be implemented using the same compute and storage infrastructure. Therefore, network slicing may allow heterogeneous services to coexist within the same network architecture via allocation of network computing, storage, and communication resources among active services. In some cases, the network slices may be dynamically created and adjusted over time based on network requirements.

The network 102 may provide one or more network slices, wherein each network slice may include a set of network functions that are selected to provide specific telecommunications services. For example, each network slice may comprise a configuration of network functions, network applications, and underlying cloud-based compute and storage infrastructure. In some cases, a network slice may correspond with a logical instantiation of a wireless network, such as an instantiation of the network 102. User equipment, such as UE 108, may connect to one or more network slices at the same time. In one embodiment, a PDU session, such as PDU session 104, may belong to only one network slice instance. In some cases, the network 102 may dynamically generate network slices to provide telecommunications services for various use cases, such as the enhanced Mobile Broadband (eMBB), Ultra-Reliable and Low-Latency Communication (URLCC), and massive Machine Type Communication (mMTC) use cases.

The core network 130 may include a plurality of network elements that are configured to offer various data and telecommunications services to subscribers or end users of user equipment, such as UE 108. Examples of network elements include network computers, network processors, networking hardware, networking equipment, routers, switches, hubs, bridges, radio network controllers, gateways, servers, virtualized network functions, and network functions virtualization infrastructure. A network element may comprise a real or virtualized component that provides wired or wireless communication network services.

Virtualization allows virtual hardware to be created and decoupled from the underlying physical hardware. One example of a virtualized component is a virtual router. Another example of a virtualized component is a virtual machine. A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors, the size of a virtual memory, and the size of a virtual disk for the virtual machine. Another example of a virtualized component is a software container or an application container that encapsulates an application's environment.

In some embodiments, applications and services may be run using virtual machines instead of containers in order to improve security. A common virtual machine may also be used to run applications and/or containers for a number of closely related network services.

The network 102 may implement various network functions, such as the core network functions and radio access network functions, using a cloud-based compute and storage infrastructure. A network function may be implemented as a software instance running on hardware or as a virtualized network function. Virtual network functions (VNFs) may comprise implementations of network functions as software processes or applications. In one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

As depicted in FIG. 1A, the core network 130 includes a user plane function (UPF) 132 for transporting IP data traffic (e.g., user plane traffic) between the UE 108 and the data network 180 and for handling packet data unit (PDU) sessions with the data network 180. The UPF 132 may comprise an anchor point between the UE 108 and the data network 180. The UPF 132 may be implemented as a software process or application running within a virtualized infrastructure or a cloud-based compute and storage infrastructure. The network 102 may connect the UE 108 to the data network 180 using a packet data unit (PDU) session 104.

The PDU session 104 may utilize one or more quality of service (QoS) flows, such as QoS flows 105 and 106, to exchange traffic (e.g., data and voice traffic) between the UE 108 and the data network 180. The one or more QoS flows may comprise the finest granularity of QoS differentiation within the PDU session 104. The PDU session 104 may belong to a network slice instance through the network 102. To establish user plane connectivity from the UE 108 to the data network 180, an AMF that supports the network slice instance may be selected and a PDU session via the network slice instance may be established. In some cases, the PDU session 104 may be of type IPv4 or IPv6 for transporting IP packets.

The radio access network 120 may include a set of one or more remote radio units (RRUs) that includes radio transceivers (or combinations of radio transmitters and receivers) for wirelessly communicating with UEs. The set of RRUs may correspond with a network of cells (or coverage areas) that provide continuous or nearly continuous overlapping service to UEs, such as UE 108, over a geographic area.

As depicted in FIG. 1A, the RAN 120 includes CPU profiles 208 that may be stored in memory or a lookup table and used by the RAN 120 to allocate CPU processing power for the RAN 120 to support UE and network traffic. The CPU profiles used by the RAN 120 may be determined based on PRB allocations, modulation and coding schemes, and quality of service metrics for the one or more user devices and/or one or more network slices supported by the RAN 120. Each CPU profile (or CPU power profile) may be associated with a number of CPU cores, corresponding CPU frequencies for each of the CPU cores, an identification of whether each CPU core is a real CPU core or a virtual CPU core, and CPU sleep/hibernate states for each of the CPU cores in the CPU power profile.

Figure 1B:
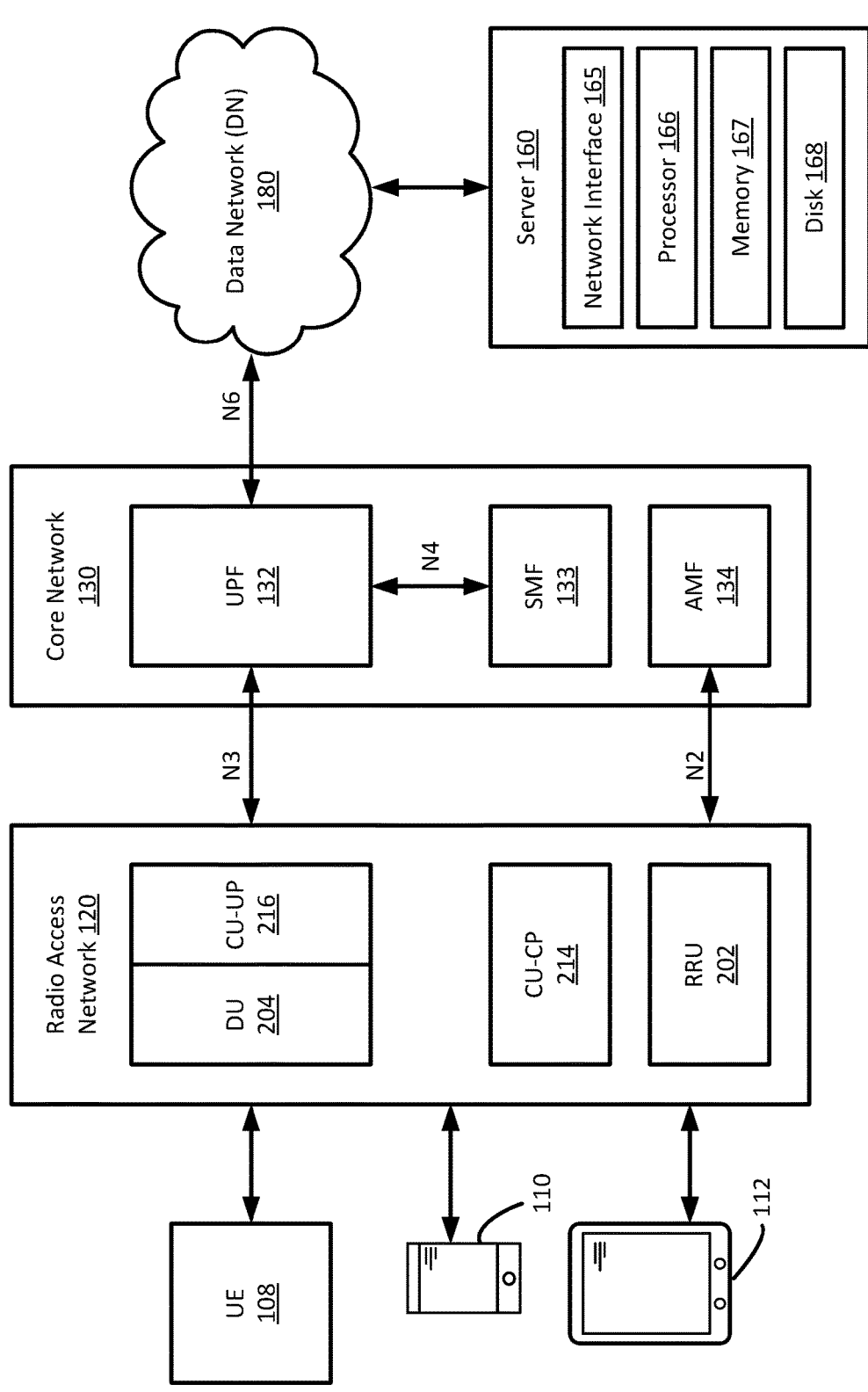
FIGS. 1B-1E depict various embodiments of a radio access network and a core network for providing a communications channel (or channel) between user equipment and a data network.

FIG. 1B depicts an embodiment of a radio access network 120 and a core network 130 for providing a communications channel (or channel) between user equipment and data network 180. The communications channel may comprise a pathway through which data is communicated between the UE 108 and the data network 180. The user equipment in communication with the radio access network 120 includes UE 108, mobile phone 110, and mobile computing device 112.

A telecommunications link (or link) may refer to a communications channel that electrically connects two or more electronic devices. A communications channel may refer to a wireless communications channel, to a physical transmission medium (e.g., a wire or cable), or to a logical connection over a multiplexed medium (e.g., a radio channel). The two or more electronic devices may include, for example, routers, servers, and computing devices. The communications channel may allow data transmissions (e.g., data packets) to be exchanged between the two or more electronic devices. In some cases, a link may comprise a physical link or a virtual circuit that uses one or more physical links.

The core network 130 includes network functions such as an access and mobility management function (AMF) 134, a session management function (SMF) 133, and a user plane function (UPF) 132. The AMF may interface with user equipment and act as a single-entry point for a UE connection. The AMF may interface with the SMF to track user sessions. The AMF may interface with a network slice selection function (NSSF) not depicted to select network slice instances for user equipment, such as UE 108. When user equipment is leaving a first coverage area and entering a second coverage area, the AMF may be responsible for coordinating the handoff between the coverage areas whether the coverage areas are associated with the same radio access network or different radio access networks.

The UPF 132 may transfer downlink data received from the data network 180 to user equipment, such as UE 108, via the radio access network 120 and/or transfer uplink data received from user equipment to the data network 180 via the radio access network 180. An uplink may comprise a radio link though which user equipment transmits data and/or control signals to the radio access network 120. A downlink may comprise a radio link through which the radio access network 120 transmits data and/or control signals to the user equipment.

The radio access network 120 may be logically divided into an RRU 202, a distributed unit (DU) 204, and a centralized unit (CU) that is partitioned into a CU user plane portion CU-UP 216 and a CU control plane portion CU-CP 214. The CU-UP 216 may correspond with the centralized unit for the user plane and the CU-CP 214 may correspond with the centralized unit for the control plane. The CU-CP 214 may perform functions related to a control plane, such as connection setup, mobility, and security. The CU-UP 216 may perform functions related to a user plane, such as user data transmission and reception functions.

The RRU 202 may perform physical layer functions, such as employing orthogonal frequency-division multiplexing (OFDM) for downlink data transmission. In some cases, the DU 204 may be located at a cell site (or a cellular base station) and may provide real-time support for lower layers of the protocol stack, such as the radio link control (RLC) layer and the medium access control (MAC) layer. The CU may provide support for higher layers of the protocol stack, such as the service data adaptation protocol (SDAP) layer, the packet data convergence control (PDCP) layer, and the radio resource control (RRC) layer. The SDAP layer may comprise the highest L2 sublayer in the 5G NR protocol stack. In some embodiments, a radio access network may correspond with a single CU that connects to multiple DUs (e.g., connecting to ten DUs), and each DU may connect to multiple RRUs (e.g., connecting to 16 RRUs). In this case, a single CU may manage ten different cell sites (or cellular base stations) and 160 different RRUs.

Figure 1C:
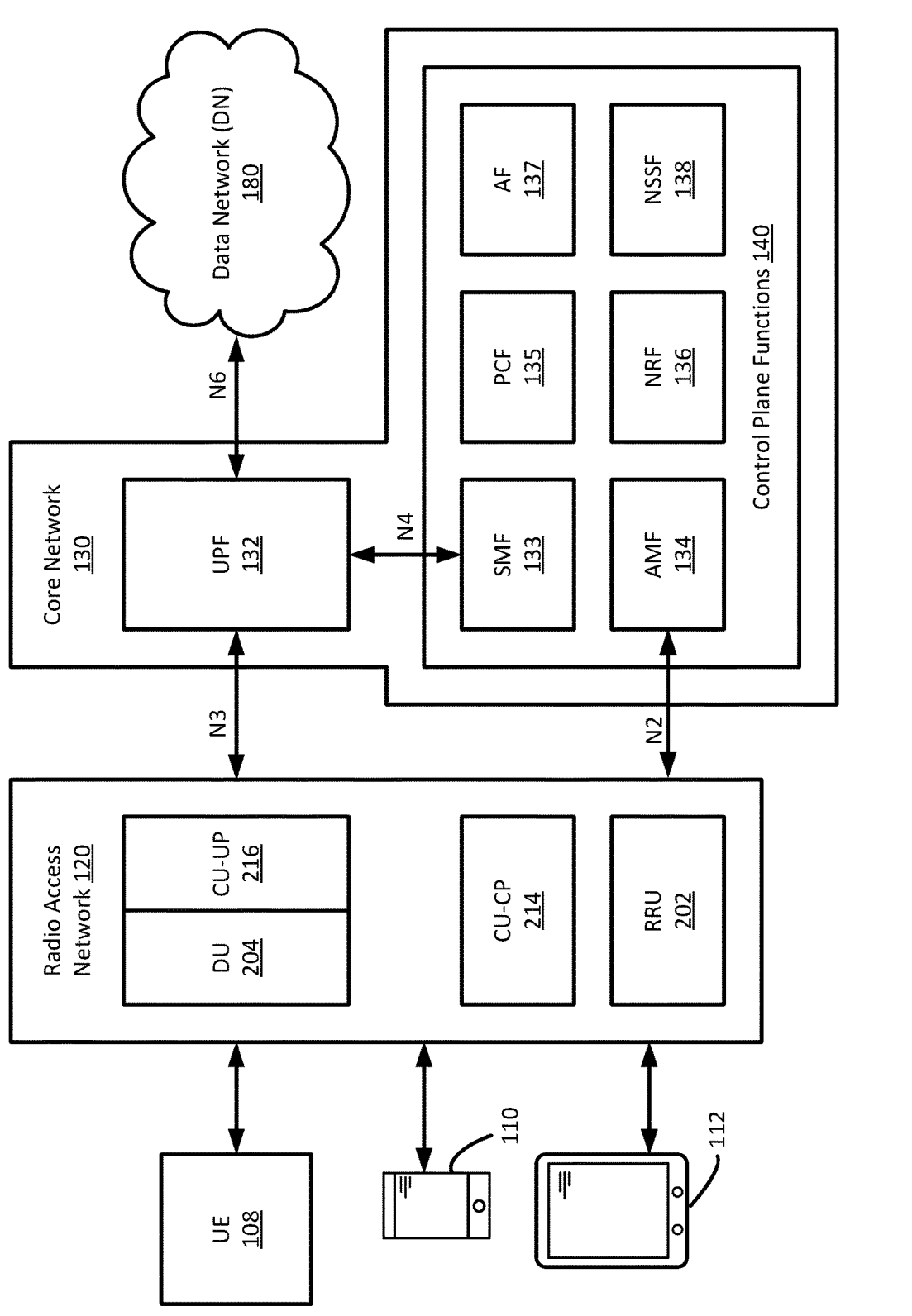

FIG. 1C depicts an embodiment of a radio access network 120 and a core network 130 for providing a communications channel (or channel) between user equipment and data network 180. The core network 130 includes UPF 132 for handling user data in the core network 130. The N2 interface may be used for transferring control plane signaling between the radio access network 120 and the AMF 134. Data is transported between the radio access network 120 and the core network 130 via the N3 interface. The data may be tunneled across the N3 interface (e.g., IP routing may be done on the tunnel header IP address instead of using end user IP addresses). This may allow for maintaining a stable IP anchor point even though UE 108 may be moving around a network of cells or moving from one coverage area into another coverage area. The UPF 132 may connect to external data networks, such as the data network 180 via the N6 interface. The data may not be tunneled across the N6 interface as IP packets may be routed based on end user IP addresses. The UPF 132 may connect to the SMF 133 via the N4 interface.

As depicted, the core network 130 includes a group of control plane functions 140 comprising SMF 133, AMF 134, PCF 135, NRF 136, AF 137, and NSSF 138. The SMF 133 may configure or control the UPF 132 via the N4 interface. For example, the SMF 133 may control packet forwarding rules used by the UPF 132 and adjust QoS parameters for QoS enforcement of data flows (e.g., limiting available data rates).

Figure 1D:
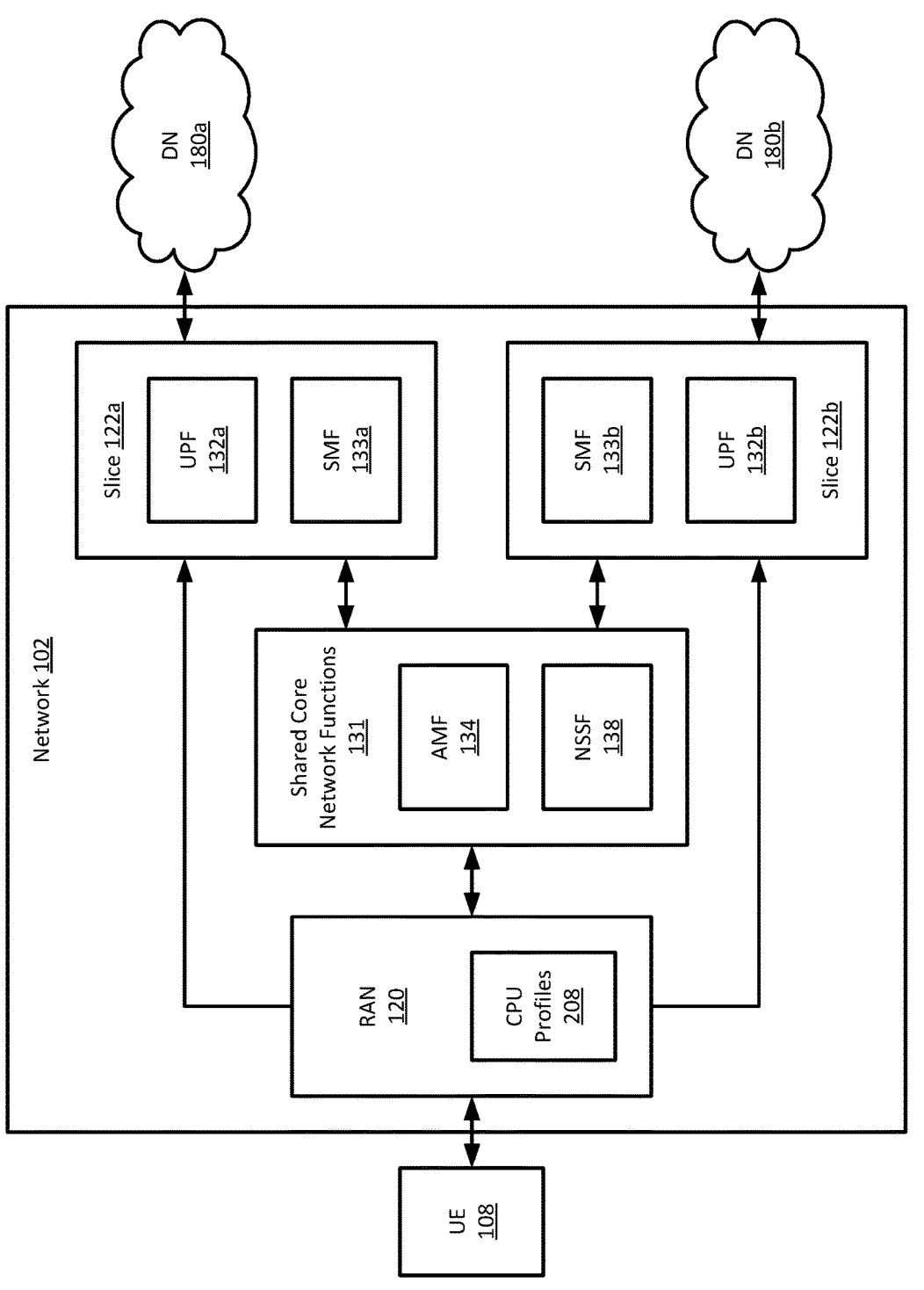

FIG. 1D depicts an embodiment of a network 102 that includes network slices 122a and 122b (also referred to as network slices 122) sharing a set of shared core network functions 131. The set of shared core network functions 131 includes AMF 134 and NSSF 138. The radio access network (RAN) 120 may support differentiated handling of traffic between isolated network slices 122a and 122b for the UE 108. The network slice selection function (NSSF) 138 within the shared core network functions 131 may support the selection of network slice instances to serve the UE 108. In some cases, network slice selection may be determined by the network (e.g., using either NSSF 138 or AMF 134) based on network slice policy. The UE 108 may simultaneously connect to data networks 180a and 180b via the network slices 122a and 122b to support different quality of service (QoS) requirements.

As depicted in FIG. 1D, the RAN 120 includes CPU profiles 208 that may comprise a set of CPU power profiles that are stored in memory or a lookup table and used by the RAN 120 to allocate CPU processing power for supporting UE traffic within the RAN 120 and/or from UE 108 to the data networks 180a and 180b. The CPU profiles 208 used by the RAN 120 may be selected by a CPU controller based on PRB allocations, MCSs, and QoS metrics for the user devices and/or network slices supported by the RAN 120.

Figure 1E:
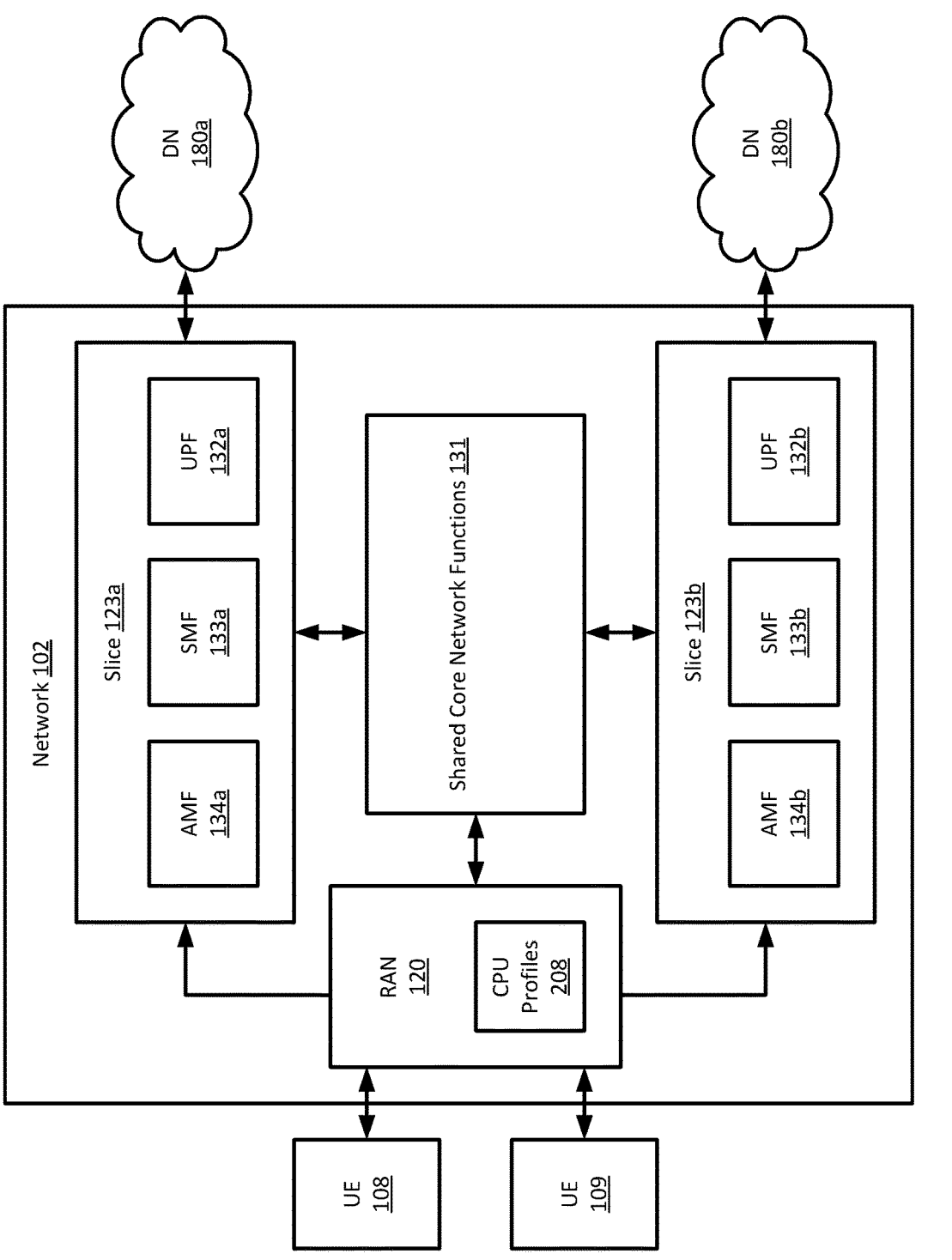

FIG. 1E depicts an embodiment of a network 102 that includes network slices 123a and 123b (also referred to as network slices 123) sharing a set of shared core network functions 131. The network slices 123 may comprise network slices that were reconfigured from the network slices 122 depicted in FIG. 1D. Network slices may be reconfigured over time due to changes in network slice policy or QoS requirements for each network slice. As depicted, the network slices 123a and 123b share a set of shared core network functions 131. Network slice 123a includes an AMF 134a, an SMF 133a, and a UPF 132a. Network slice 123b includes an AMF 134b, an SMF 133b, and a UPF 132b.

As depicted in FIG. 1E, two user devices UE 108 and UE 109 are in communication with the RAN 120. In response to detecting that UE traffic has risen or fallen, or that the number of UEs supported by the RAN 120 has increased or decreased, the RAN 120 may update the CPU profiles 208 used by the RAN 120 for supporting the changes in UE or network traffic.

Figure 2A:
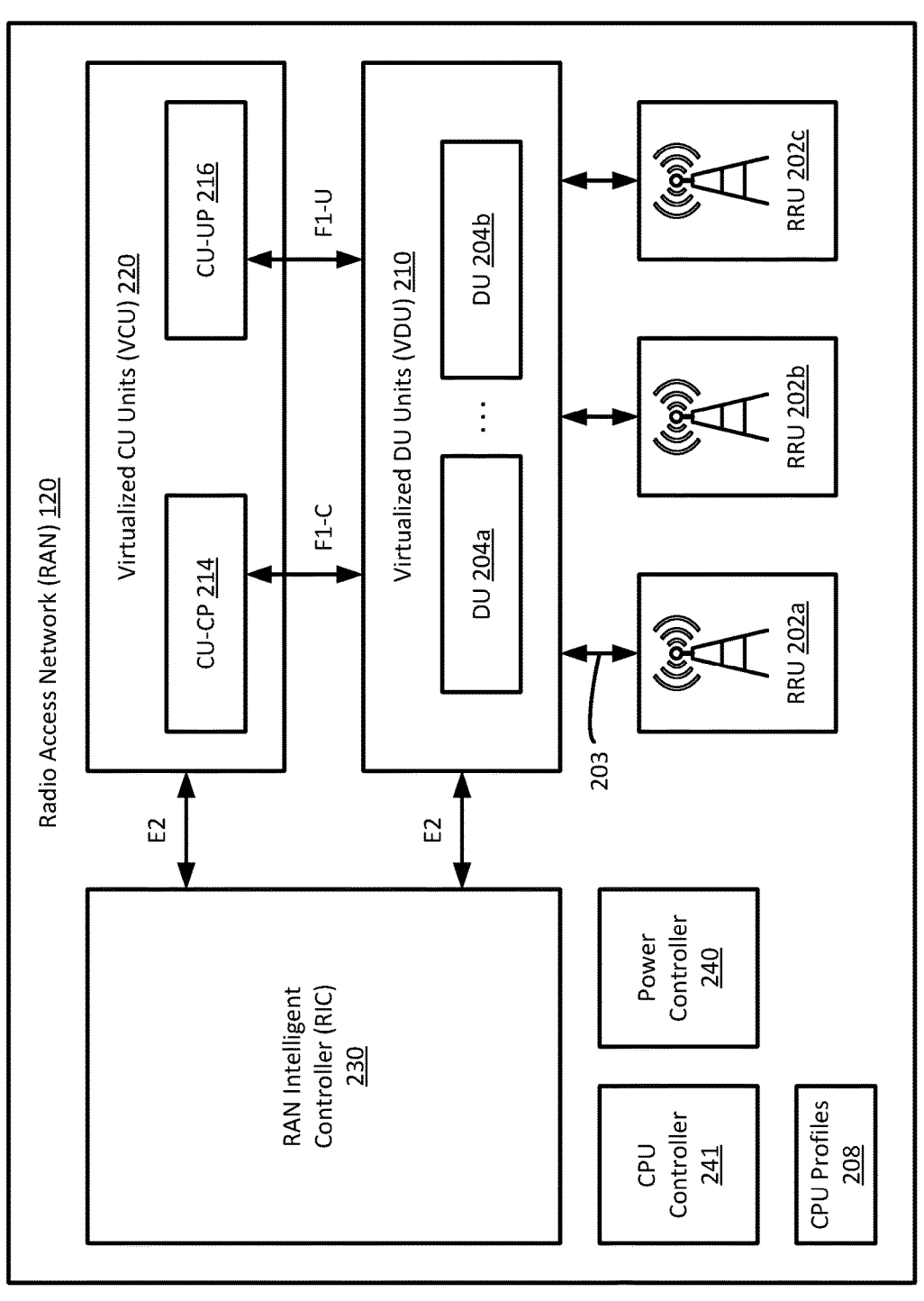
FIG. 2A depicts an embodiment of a radio access network.

FIG. 2A depicts an embodiment of a radio access network (RAN) 120. The radio access network 120 includes virtualized CU units 220, virtualized DU units 210, remote radio units (RRUs) 202a-202c, a RAN intelligent controller (RIC) 230, and a power controller 240. The virtualized DU units 210 may comprise virtualized versions of distributed units (DUs), such as DU 204a-204b. Each distributed unit (DU) 204 may comprise a logical node configured to provide functions for the radio link control (RLC) layer, the medium access control (MAC) layer, and the physical layer (PHY) layers. The PHY layer may be responsible for signal processing operations and the MAC layer may be responsible for the real-time scheduling of radio resources among user devices. The RLC layer may perform error detection and correction tasks to provide a reliable wireless communications link between the RAN 120 and one or more user devices (or UEs).

The virtualized CU units 220 may comprise virtualized versions of centralized units (CUs) comprising a centralized unit for the user plane CU-CP 216 and a centralized unit for the control plane CU-CP 214. In one example, the centralized units (CUs) may comprise a logical node configured to provide functions for the radio resource control (RRC) layer, the packet data convergence control (PDCP) layer, and the service data adaptation protocol (SDAP) layer. The centralized unit for the control plane CU-CP 214 may comprise a logical node configured to provide functions of the control plane part of the RRC and PDCP. The centralized unit for the user plane CU-CP 216 may comprise a logical node configured to provide functions of the user plane part of the SDAP and PDCP. Virtualizing the control plane and user plane functions allows the centralized units (CUs) to be consolidated in one or more data centers on RAN-based open interfaces.

The remote radio units (RRUs) 202a-202c may correspond with different cell sites. A single DU may connect to multiple RRUs via a fronthaul interface 203. The fronthaul interface 203 may provide connectivity between DUs and RRUs. For example, DU 204a may connect to 16 RRUs via the fronthaul interface 203. Centralized units (CUs) may control the operation of multiple DUs via a midhaul F1 interface that comprises the F1-C and F1-U interfaces. The F1 interface may support control plane and user plane separation, and separate the Radio Network Layer and the Transport Network Layer. In one example, the centralized unit for the control plane CU-CP 214 may connect to ten different DUs within the virtualized DU units 210. In this case, the centralized unit for the control plane CU-CP 214 may control ten DUs and 160 RRUs.

The RAN intelligent controller (RIC) 230 may control the underlying RAN elements via the E2 interface. The E2 interface connects the RAN intelligent controller (RIC) 230 to the distributed units (DUs) 204a-204b and the centralized units CU-CP 214 and CU-UP 216. The RAN intelligent controller (RIC) 230 may comprise a near-real time RIC. A non-real-time RIC (NRT-RIC) not depicted may comprise a logical node allowing non-real time control rather than near-real-time control and the near-real-time RIC 230 may comprise a logical node allowing near-real-time control and optimization of RAN elements and resources on the bases of information collected from the distributed units (DUs) 204a-204b and the centralized units CU-CP 214 and CU-UP 216 via the E2 interface.

The power controller 240 may be configured to dynamically adjust RAN power consumption based on fluctuations in network traffic, throughput, latency, and/or packet error rates in order to increase energy efficiency while maintaining quality of service (QoS) metrics, such as satisfying a threshold network throughput and a threshold network latency for a user device connection or a network slice. The power controller 240 may be configured to dynamically allocate physical resource blocks (PRBs) for the RAN 120 and/or determine CPU profiles 208 based on the PRB allocations. The CPU profiles 208 may be stored in a volatile or non-volatile memory within the RAN 120.

The CPU controller 241 may periodically update CPU profiles 208 based on the PRB allocations set by the power controller 240, MCSs, and QoS metrics for UE traffic supported by the RAN 120. In some cases, upon detection of an increase in UE traffic or an increase in the number of user devices supported by the RAN 120, the CPU controller 241 may boost CPU power before the power controller 240 allocates more resource blocks to provide a higher network throughput. Upon detection of a decrease in UE traffic or a decrease in the number of user devices supported by the RAN 120, the power controller 240 may reduce the allocation of resource blocks before the CPU controller 241 reduces the CPU power or updates the CPU profiles 208 to provide lower CPU power consumption for the RAN 120.

In some embodiments, as PRB allocations are dynamically adjusted for a network slice (e.g., slice 123a in FIG. 1E), the CPU controller 241 may exhaustively search for the optimal CPU profile out of a set of CPU profiles with the lowest power consumption that is capable of satisfying QoS metrics for the network slice.

FIG. 2B depicts another embodiment of a radio access network 120. As depicted, the radio access network 120 includes hardware-level components and software-level components. The hardware-level components include one or more processors 270, one or more memory 271, and one or more disks 272. The software-level components include software applications, such as the power controller 240, CPU controller 241, RAN intelligent controller (RIC) 230, virtualized CU unit (VCU) 220, and virtualized DU unit (VDU) 210. The software-level components may be run using the hardware-level components or executed using processor and storage components of the hardware-level components. In one example, one or more of the power controller 240, RIC 230, VCU 220, and VDU 210 may be run using the processor 270, memory 271, and disk 272. In another example, one or more of the power controller 240, RIC 230, VCU 220, and VDU 210 may be run using a virtual processor and a virtual memory that are themselves executed or generated using the processor 270, memory 271, and disk 272.

The software-level components also include virtualization layer processes, such as virtual machine 273, hypervisor 274, container engine 275, and host operating system 276. The hypervisor 274 may comprise a native hypervisor (or bare-metal hypervisor) or a hosted hypervisor (or type 2 hypervisor). The hypervisor 274 may provide a virtual operating platform for running one or more virtual machines, such as virtual machine 273. A hypervisor may comprise software that creates and runs virtual machine instances. Virtual machine 273 may include a plurality of virtual hardware devices, such as a virtual processor, a virtual memory, and a virtual disk. The virtual machine 273 may include a guest operating system that has the capability to run one or more software applications, such as the RAN intelligent controller (RIC) 230. The virtual machine 273 may run the host operation system 276 upon which the container engine 275 may run. A virtual machine, such as virtual machine 273, may include one or more virtual processors.

In some cases, the software-level components may be run using a dedicated hardware server. In other cases, the software-level components may be run using a virtual machine or containerized environment running on a plurality of machines. In various embodiments, the software-level components may be run from the cloud (e.g., the software-level components may be deployed using a cloud-based compute and storage infrastructure).

Application containers (or containers) may allow applications to be bundled with their own libraries and configuration files, and then executed in isolation on a single operating system (OS) kernel. In some cases, a container may include the compiled code for an application (e.g., composed of microservices) along with the binaries and libraries necessary to execute the application.

As depicted in FIG. 2B, a container engine 275 may run on top of the host operating system 276 in order to run multiple isolated instances (or containers) on the same operating system kernel of the host operating system 276. Containers may perform virtualization at the operating system level and may provide a virtualized environment for running applications and their dependencies. The container engine 275 may acquire a container image and convert the container image into running processes. In some cases, the container engine 275 may group containers that make up an application into logical units (or pods). A pod may contain one or more containers and all containers in a pod may run on the same node in a cluster. Each pod may serve as a deployment unit for the cluster. Each pod may run a single instance of an application.

In some embodiments, a virtualized infrastructure manager not depicted may run on the RAN 120 in order to provide a centralized platform for managing a virtualized infrastructure for deploying various components of the RAN 120. The virtualized infrastructure manager may manage the provisioning of virtual machines, containers, and pods. The virtualized infrastructure manager may also manage a replication controller responsible for managing a number of pods.

Figure 3:
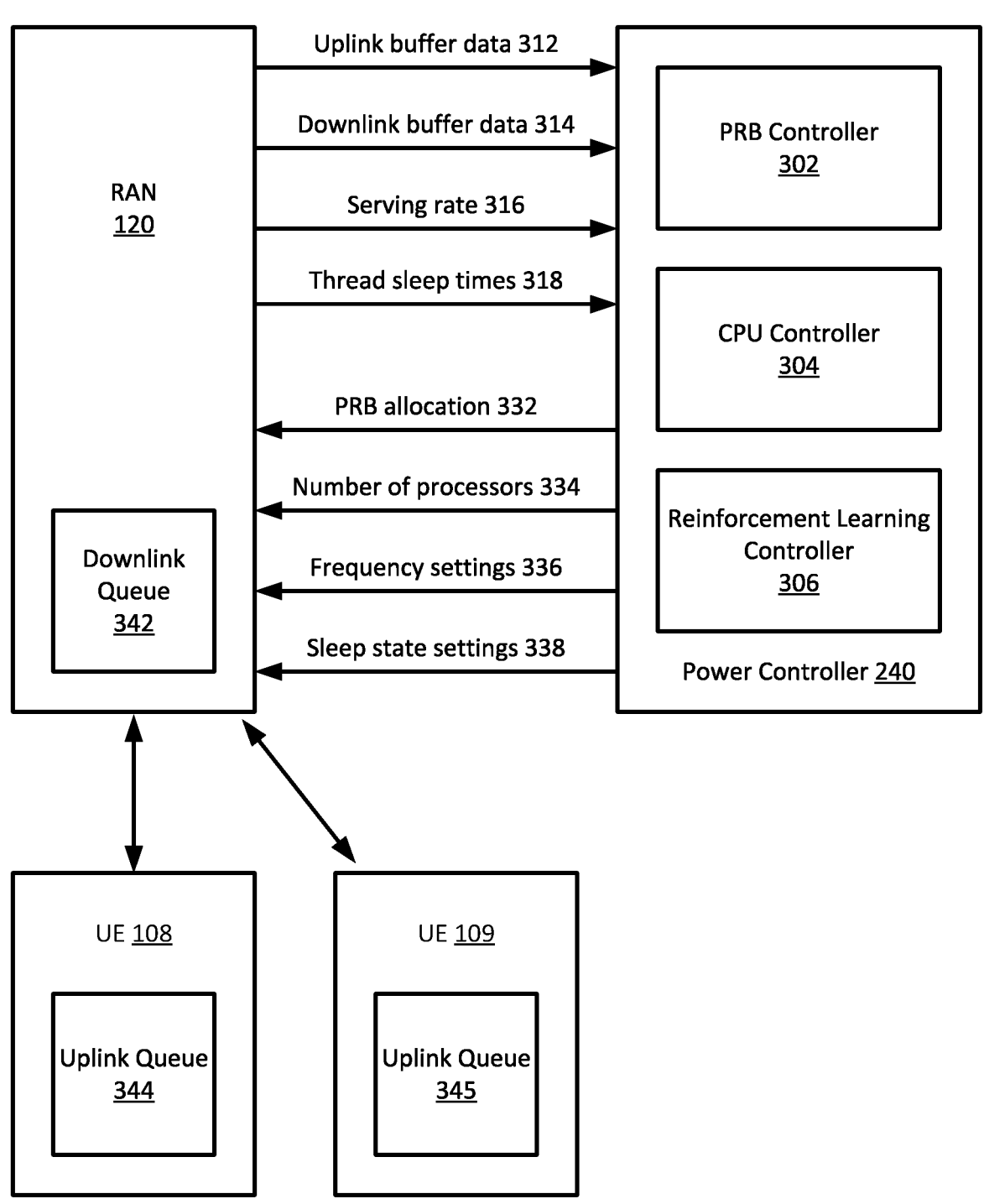
FIG. 3 depicts one embodiment of a radio access network in communication with a power controller.

FIG. 3 depicts one embodiment of a RAN 120 in communication with a power controller 240 for optimizing power and/or energy consumed by the RAN 120 via real-time adjustment of the number of physical resource blocks (PRBs) used by the RAN 120, the number of processing cores used for executing one or more RAN components, and/or the clock frequencies used by the processing cores. The power controller 240 may be implemented as part of the RAN 120 or may be in communication with the RAN 120 via an interface in which the power controller 240 receives input signals including uplink buffer data 312, downlink buffer data 314, serving rate 316, and thread sleep times 318. The power controller 240 may output signals including PRB allocation 332, number of processors 334, frequency settings 336, and sleep state settings 338.

As depicted in FIG. 3, the power controller 240 includes a PRB controller 302, CPU controller 304, and a reinforcement learning controller 306. In some cases, the PRB controller 302 may increase or decrease the number of PRBs allocated to wireless user devices or UEs based on uplink and downlink data transmission times, and uplink and downlink queue sizes. The amount of data in a downlink queue (or downlink buffer), such as downlink queue 342, that is currently queued within the RAN 120 for transmission to a user device may be determined based on the RLC buffer occupancy for the RAN 120. The RLC buffer occupancy for the RAN 120 may be acquired via downlink buffer data 314, which may provide the RLC buffer occupancy and a queue size for the downlink queue 342. The amount of data in an uplink queue (or uplink buffer), such as uplink queue 344, available for transmission to the RAN 120 may be indicated in a Buffer Status Report (BSR) from a user device, such as UE 108. The BSR may be acquired via the uplink buffer data 312, which may provide the BSR and a queue size for the uplink queue 344.

In some cases, the uplink buffer data 312 may specify queue sizes and/or queue delays for each uplink queue of each UE that is transferring data to the RAN 120. For example, the uplink buffer data 312 may include data specifying a first queue size of the uplink queue 344 of UE 108 and a second queue size of the uplink queue 345 of UE 109.

PRBs may be allocated by the power controller 240 based on quality of service (QoS) requirements, network traffic conditions, and available computing and network resources within the RAN 120. PRB allocations may be transmitted to the RAN 120 via the output PRB allocation 332. The allocation of PRBs is an important factor in determining data transmission rates and quality of service provided to user devices such as UE 108 and UE 109. In some cases, each user device, such as UE 108, may be allocated at most a maximum number of PRBs (e.g., at most 100 PRBs which may correspond with a total bandwidth of 20 MHz). By dynamically allocating PRBs to user devices based on one or more QoS parameters, a RAN may optimize the power consumption of its computing and storage resources while satisfying the QoS parameters. The one or more QoS parameters may include a bit rate, a bit error rate, a throughput, a packet loss, a maximum packet loss rate, a packet error rate, a packet delay variation, an end-to-end latency, a point-to-point latency between virtualized network functions, a network availability, and a network bandwidth associated with a network slice.

From the perspective of the PRB controller 302, time-varying user traffic to and from user devices, such as UE 108, manifests as a "queue" of data for transmission on the uplink or downlink, respectively. The downlink may refer to a link from the RAN 120 to a user device. The uplink may refer to a link from a user device to the RAN 120. A data size for the uplink queue 344 of data to be sent to the RAN 120 from the user device UE 108 may be acquired from BSRs provided by the UE 108. A data size for the downlink queue 342 of data to be sent to the UE 108 from the RAN 120 may be determined based on the RLC buffer occupancy in the RAN 120.

Over time, the queue sizes for the downlink queue 342, the uplink queue 344, and the uplink queue 345 may be monitored. For a given time window or decision time interval (e.g., a 10 ms time interval), a total queue size may be calculated as the sum of the downlink queue 342 and the uplink queue 344 queue sizes. In some cases, the total queue size may be calculated as the sum of the queue sizes for the downlink queue 342 and all uplink queues including the uplink queue 344 and the uplink queue 345.

In response to varying uplink and downlink queue sizes, the PRB controller 302 may adapt the allocation of PRBs to UE 108 in real-time to determine a service rate (e.g., in data packets per second) that drains or maintains the uplink and downlink queues. In general, a greater number of PRBs will correspond with a higher service rate and enable a higher throughput of user traffic; however, the higher service rate may come at the cost of increased power and energy consumption. In some cases, the service rate (or the draining speed of the queues) may be computed using the sum of the transport block sizes divided by a particular time period (e.g., every second). The transport block sizes may be extracted from Functional Application Platform Interface (FAPI) UL-SCH messages for the uplink and FAPI DL-SCH messages for the downlink.

In some embodiments, the PRB controller 302 may periodically (e.g., every 10 ms) compute an average queueing delay (T) using the total queue size (Q value) divided by the service rate (R value). The PRB controller 302 may acquire historical total queue sizes and service rates during past time intervals and output a number of PRBs to allocate to each user device that optimizes the QoS for each user device (e.g., allocating the number of PRBs to minimize the average network latency or the queuing delay of buffered data). In some cases, the Q and R values may be measured in the same time window, or they can be smoothed values in a sliding window using a moving average, such as an exponentially weighted moving average (EWMA).

In some embodiments, the PRB controller 302 may adjust the number of PRBs allocated to the UE 108 over time in order to maintain a target queueing delay (T'). For a given time period (e.g., the past 10 ms), the PRB controller 302 may compute an average queueing delay for the time period and then compare the average queueing delay to the target queueing delay. If the average queueing delay (T) is greater than the target queueing delay (T'), then the number of PRBs allocated to the UE 108 should be increased. The increase in the number of PRBs may be made in an additive or a multiplicative manner. In some embodiment, the number of PRBs allocated to the UE 108 may be increased in proportion to the difference between T and T'. In one example, the number of PRBs allocated to the UE 108 may be increased by a customizable weighting factor (w1) or a user-define function (f1) times the difference between T and T'. The increase in the number of PRBs allocated to the UE 108 may increase the service rate at the expense of CPU power.

One example of a function for determining the number of PRBs allocated to the UE 108 may be expressed using the following equation (1):

$$\text{Next\_N} = \text{Prior\_N} - w1 * (T' - T) \qquad (1)$$

In equation (1), Next_N is the updated number of PRBs, Prior_N is the previous number of PRBs allocated during a prior decision time interval, w1 is a customizable weight, T' is the target queueing delay, and T is the average queueing delay.

On the other hand, if the average queueing delay (T) is less than the target queueing delay (T'), then the number of PRBs allocated to the UE 108 should be decreased. The decrease in the number of PRBs may be made in an additive or a multiplicative manner. In some embodiment, the number of PRBs allocated to the UE 108 may be decreased in proportion to the difference between T and T'. In one example, the number of PRBs allocated to the UE 108 may be decreased by a customizable weighting factor (w2) or a user-define function (f2) times the difference between T and T'. The decrease in the number of PRBs allocated to the UE 108 may decrease CPU power at the expense of reduced packet throughput.

One example of a function for determining the number of PRBs allocated to the UE 108 may be expressed using the following equation (2):

$$\text{Next\_N} = \text{Prior\_N} * w2 * (T - T') \qquad (2)$$

In equation (2), Next_N is the updated number of PRBs, Prior_N is the previous number of PRBs allocated during a prior decision time interval, w2 is a customizable weight, T' is the target queueing delay, and T is the average queueing delay.

One potential drawback of a PRB controller maintaining a target queueing delay is that buffered data may be unnecessarily delayed by approximately T' before being sent out; this may be referred to as an issue of "standing queue." To overcome the potential drawback, in some embodiments, the number of PRBs allocated to the UE 108 may be constantly decreased when the average queueing delay (T) is below a threshold $T_{low}$ to proactively induce queuing delay as a reduction in the number of PRBs allocated to the UE 108 may correspond with a lower CPU power. When the average queueing delay T exceeds a threshold Thigh (Thigh>Tlow), the PRB controller 302 may increase the number of PRBs allocated to the UE 108. The increase in the number of PRBs may be made in an additive or a multiplicative manner based on the change in average queueing delay or the change in total queue sizes since the previous decision time interval. Between the two thresholds Tlow and Thigh, a gradient-based approach may be adopted. In this case, if the gradient of T (or the difference between T and T') is greater than zero, it indicates that the queues are building up and thus the number of PRBs (N) may be increased in proportion to the gradient of T ($\Delta$T); otherwise, the number of PRBs may be decreased in proportion to the gradient of T.

One example of a set of functions for determining the number of PRBs allocated to the UE 108 may be expressed using the following equations (3), (4), and (5):

$$\text{If } T < T_{low}, \text{ let Next\_N} = \text{Prior\_N} - w1 * (T_{low} - T) \qquad (3)$$

$$\text{If } T > T_{high}, \text{ let Next\_N} = \text{Prior\_N} * w2 * (T - T_{high}) \qquad (4)$$

$$\text{If } T_{low} \leq T \leq T_{high}, \qquad (5)$$

$$\text{If } \Delta Q \leq 0 \text{ let Next\_N} = \text{Prior\_N} - w3 * \Delta Q$$

$$\text{If } \Delta Q > 0, \text{ let Next\_N} = \text{Proir\_N} * w4 * \Delta Q$$

In equations (3), (4), and (5), $\Delta$Q is the change in total queue size between the current decision time interval and the prior decision time interval, T is the average queueing delay, $T_{low}$ is the low queueing delay threshold, $T_{high}$ is the high queueing delay threshold, the Next_N is the updated number of PRBs to be allocated, the Prior_N is the previous number of PRBs previously allocated, and w1, w2, w3, and w4 are customizable weights. The customizable weights may be stored within a lookup table in the RAN.

Reinforcement learning may refer to machine learning techniques in which intelligent "agents" take "actions" within an environment in order to maximize a cumulative "reward" function. In some embodiments, the number (N) of PRBs allocated to the UE 108 may be adjusted on a periodic basis by applying reinforcement learning techniques to historical Q and R values. The reinforcement learning techniques may implemented using the reinforcement learning controller 306. Q values may correspond with a total queue size for a set of queues. R values may correspond with an effective service rate for the set of queues. Reinforcement learning may be applied in view of the sequential decision nature of the problem in which PRB allocations are periodically determined during decision time intervals. Once a reinforcement learning algorithm chooses an N, it will impact the future Q and R values. Thus, the goal of the reinforcement learning algorithm may be to choose a course of decisions for N, such that on the long term average, the minimal number of PRBs (corresponding to the lowest CPU power consumption) are allocated to achieve the lowest queuing delay (or the optimal QoS).

The "state" (or input to the reinforcement learning algorithm) may comprise the historical time series of Q and R values along with other RAN telemetry such as signal-to-noise-ratio (SNR) values. The "action" (or output of the reinforcement learning algorithm) is N (or the number of PRBs to be allocated). To reduce the dimensionality of the action space, a discrete number of PRB values or profiles may be targeted (e.g., selecting between 20, 50, 150, and 173PRBs). The "reward" (or feedback received by the reinforcement learning algorithm) may comprise feedback from the RAN system to indicate the action's quality. In some cases, the reward may be defined as "−$\alpha$×N×$\beta$×T" wherein $\alpha$ and $\beta$ are two positive coefficients in order to penalize higher PRB allocation and longer queuing delay. The reinforcement learning algorithm may be encoded into a neural network, which is trained to learn the mapping of states to actions so as to collect the maximum cumulative rewards. In some embodiments, reinforcement learning techniques for both continuous actions and discrete actions may be applicable to train the neural network model. For example, the reinforcement learning techniques may include DQN (Deep Q Network), PPO (Proximal Policy Optimization), A2C (Advantage Actor Critic), A3C (Asynchronous Advantage Actor-Critic), and SAC (Soft Actor Critic).

As depicted in FIG. 3, the CPU controller 304 may determine an optimal CPU power profile for each PRB allocation and a given MCS index that provides the lowest power consumption that is capable of consistently satisfying QoS parameters. The CPU power profile search may be performed once for every model of a vRAN server with a different CPU model or other hardware specs, such as memory and disk sizes. The optimal CPU power profiles may be encoded in a lookup table during the deployment of the CPU controller 304, enabling safe, timely, and light-weight control of the CPU power consumption for the RAN system.

FIG. 4A depicts a flowchart describing one embodiment of a process for dynamically allocating PRBs. In one embodiment, the process of FIG. 4A may be performed by a power controller, such as the power controller 240 in FIG. 2A. In another embodiment, the process of FIG. 4A may be implemented using a cloud-based computing platform or cloud-based computing services.

In step 402, an uplink queue size of an uplink queue that buffers data within a user device is acquired. The user device may correspond with UE 108 in FIG. 3 and the uplink queue may correspond with uplink queue 344 in FIG. 3. In step 404, a downlink queue size of a downlink queue that buffers data within a radio access network is acquired. The radio access network may correspond with RAN 120 in FIG. 3 and the downlink queue may correspond with downlink queue 342 in FIG. 3. In step 406, a total queue size for the uplink and downlink queues is determined. The total queue size may comprise the sum of the uplink queue size and the downlink queue size. In step 408, a service rate for the uplink and downlink queues is determined.

In some cases, the service rate may correspond with a draining speed of the uplink and downlink queues. The service rate may correspond with an average draining speed for the uplink and downlink queues. In step 410, an average queuing delay is determined based on the total queue size and the service rate. In one example, the average queuing delay may be computed as the total queue size divided by the service rate. In step 412, a target queuing delay is identified. The target queuing delay may be identified via a lookup table based on one or more quality of service metrics required for a user device or network slice.

In step 414, it is detected that the average queuing delay is greater than the target queuing delay. In step 416, a number of physical resource blocks used for transmitting data between the radio access network and the user device is increased in response to detection that the average queuing delay is greater than the target queuing delay. The increase in the number of PRBs may be made in an additive or a multiplicative manner. In step 418, it is detected that the average queuing delay is not greater than the target queuing delay. In step 420, the number of physical resource blocks used for transmitting data between the radio access network and the user device is decreased in response to detection that the average queuing delay is not greater than the target queuing delay. The decrease in the number of PRBs may be made in an additive or a multiplicative manner. In some cases, the number of physical resource blocks may be periodically transmitted to a radio access network from a PRB controller, such as the PRB controller 302 in FIG. 3.

FIGS. 4B-4C depict a flowchart describing another embodiment of a process for dynamically allocating PRBs. In one embodiment, the process of FIGS. 4B-4C may be performed by a power controller, such as the power controller 240 in FIG. 2A. In another embodiment, the process of FIGS. 4B-4C may be implemented using a cloud-based computing platform or cloud-based computing services.

In step 432, a first average queuing delay for transmitting data between a radio access network and a user device during a first time period is determined. In step 434, it is detected that the first average queuing delay during the first time period is less than a low threshold queuing delay. In step 436, a number of physical resource blocks used for transmitting data between the radio access network and the user device is decreased in response to detection that the first average queuing delay during the first time period is less than the low threshold queuing delay. The decrease in the number of PRBs may be made in an additive or a multiplicative manner.

In step 438, a second average queuing delay for transmitting data between the radio access network and the user device during a second time period is determined. The second time period may be subsequent to the first time period. In step 440, it is detected that the second average queuing delay during the second time period is greater than a high threshold queuing delay that is greater than the low threshold queuing delay. In step 442, the number of physical resource blocks used for transmitting data between the radio access network and the user device is increased in response to detection that the second average queuing delay during the second time period is greater than the high threshold queuing delay. The increase in the number of PRBs may be made in an additive or a multiplicative manner.

In step 444, a third average queuing delay for transmitting data between the radio access network and the user device during a third time period is determined. The third time period may be subsequent to the second time period. In step 446, it is detected that the third average queuing delay during the third time period is between the high threshold queuing delay and the low threshold queuing delay (e.g., detecting that the third average queuing delay is less than the high threshold queuing delay and greater than the low threshold queuing delay). In step 448, an uplink queue size of an uplink queue that buffers data to be transmitted from the user device to the radio access network is identified. In step 450, a downlink queue size of a downlink queue that buffers data to be transmitted from the radio access network to the user device is identified. In step 452, a total queue size is computed using the uplink queue size and the downlink queue size.

In some cases, updates to PRB allocations may be made on a periodic basis during decision time intervals (e.g., every 1 ms). In step 454, it is detected that the total queue size has grown since a prior decision time interval. In step 456, the number of physical resource blocks used for transmitting data between the radio access network and the user device is increased in response to detection that the total queue size has grown since a prior decision time interval. In step 458, the number of physical resource blocks used for transmitting data between the radio access network and the user device is decreased in response to detection that the total queue size has not grown since the prior decision time interval.

FIG. 4D depicts a flowchart describing another embodiment of a process for dynamically allocating PRBs. In one embodiment, the process of FIG. 4D may be performed by a power controller, such as the power controller 240 in FIG. 2A. In another embodiment, the process of FIG. 4D may be implemented using a cloud-based computing platform or cloud-based computing services.

In step 472, a first average queuing delay for data trans-missions between a radio access network and a user device during a first decision time interval is determined. In step 474, it is detected that the first average queuing delay is greater than a threshold queuing delay. In step 476, an uplink queue size of an uplink queue that buffers data within the user device is acquired. In step 478, a downlink queue size of a downlink queue that buffers data within the radio access network is acquired. In step 480, a service rate for the uplink and downlink queues is determined. In step 482, a number of physical resource blocks used for transmitting data between the radio access network and the user device is generated based on the first average queuing delay, the threshold queuing delay, the uplink queue size, the downlink queue size, and the service rate. In some embodiments, a reinforcement learning algorithm may be utilized to determine the number of physical resource blocks used for transmitting data between the radio access network and the user device based on the first average queuing delay, the threshold queuing delay, the uplink queue size, the downlink queue size, and the service rate. A reward function for the reinforcement learning algorithm may comprise a function that penalizes higher PRB allocation and longer queuing delay. The reinforcement learning algorithm may be encoded into a neural network. In step 484, the number of physical resource blocks is stored or transmitted.

FIG. 5A depicts a flowchart describing one embodiment of a process for adjusting a CPU configuration for a radio access network. In some cases, CPU configurations may be applied on a per user device basis or on a per network slice basis. In other cases, a CPU configuration may be shared among a plurality of user devices or among a plurality of network slices. In one embodiment, the process of FIG. 5A may be performed by a CPU controller, such as the CPU controller 241 in FIG. 2A. In another embodiment, the process of FIG. 5A may be implemented using a cloud-based computing platform or cloud-based computing services.

In step 502, an increase in user device traffic between a radio access network and a user device is detected. The radio access network may correspond with RAN 120 in FIG. 1A and the user device may correspond with UE 108 in FIG. 1A. The increase in the user device traffic may be associated with an increase in the amount of data being transferred between the radio access network and the user device. In step 504, a number of physical resource blocks used for transmitting data between the radio access network and the user device is determined in response to detecting the increase in the user device traffic. One example of a process for determining a number of physical resource blocks is depicted in FIG. 4D.

In step 506, a plurality of CPU power profiles associated with CPU configurations for the radio access network is acquired. The plurality of CPU power profiles may correspond with various potential CPU configurations for the radio access network. Each CPU power profile of the plurality of CPU power profiles may be associated with a number of CPU cores, corresponding CPU frequencies for each of the CPU cores, an identification of whether each CPU core is a real CPU core or a virtual CPU core, and CPU sleep/hibernate states for each of the CPU cores in the CPU power profile.

In step 508, a set of quality of service metrics for the user device traffic between the radio access network and the user device is acquired. The set of quality of service metrics may include one or more QoS metrics, such as satisfying a threshold network throughput (e.g., a throughput of at least 10 Gbps) or a threshold network latency (e.g., a latency of less than 2 ms). In step 510, a first CPU power profile out of the plurality of CPU power profiles that provides a lowest power CPU configuration for the radio access network that satisfies the set of quality of service metrics given the number of physical resource blocks is identified. In some cases, a CPU controller, such as the CPU controller 241 in FIG. 2A, may perform an exhaustive search of the plurality of CPU power profiles to identify the optimal CPU power profile with the lowest power consumption that is capable of sustaining network traffic between the radio access network and the user device subject to the set of quality of service metrics.

In step 512, the first CPU power profile is stored. The first CPU power profile may be stored as one of a number of active CPU power profiles used by the radio access network to generate active CPU configurations. In one example, the radio access network may correspond with the RAN 120 depicted in FIG. 2A which may support user traffic to ten different user devices and the CPU profiles 208 in FIG. 2A may comprise ten CPU profiles, with each of the ten CPU profiles providing a CPU configuration for supporting user traffic between one of the ten user devices and the RAN 120.

In step 514, the radio access network is configured using the first CPU power profile. The radio access network may instantiate or execute a number of CPUs in accordance with the CPU configuration specified by the first CPU power profile. In some cases, the lowest power CPU configuration may be applied to the radio access network to provide CPU resources for supporting the transmission of data between the radio access network and the user device. The lowest power CPU configuration may be applied to the radio access network prior to an increase in the number of physical resource blocks used for transmitting data between the radio access network and the user device; an increase in the number of physical resource blocks may occur in response to detecting the increase in user device traffic between the radio access network and the user device in step 502.

In some embodiments, upon detection of an increase in user device traffic between the radio access network and the user device, a CPU controller may boost CPU power via application of a CPU power profile that includes additional CPU cores or CPU cores with increased processor frequency before a PRB controller assigns an increase in the number of physical resource blocks used for transmitting data between the radio access network and the user device.

FIG. 5B depicts a flowchart describing one embodiment of a process for dynamically adjusting CPU configurations for a radio access network using CPU power profiles. In one embodiment, the process of FIG. 5B may be performed by a CPU controller, such as the CPU controller 241 in FIG. 2A. In another embodiment, the process of FIG. 5B may be implemented using a cloud-based computing platform or cloud-based computing services.

In step 532, a change in user device traffic between a radio access network and a user device is detected. In one example, the change in user device traffic between the radio access network and the user device may correspond with an increase in the amount of data that is transferred between the radio access network and the user device. The radio access network may correspond with RAN 120 in FIG. 1A and the user device may correspond with UE 108 in FIG. 1A. In step 534, a number of physical resource blocks used for transmitting data between the radio access network and the user device is determined in response to detecting the change in the user device traffic. Examples of processes for determining or updating a number of physical resource blocks are depicted in FIGS. 4A-4D.

In step 536, a plurality of CPU power profiles associated with a plurality of CPU configurations for the radio access network is acquired. The plurality of CPU power profiles may correspond with various potential CPU configuration for the radio access network. Each CPU power profile of the plurality of CPU power profiles may be associated with a number of CPU cores, corresponding CPU frequencies for each of the CPU cores, an identification of whether each CPU core is a real CPU core or a virtual CPU core, and CPU sleep/hibernate states for each of the CPU cores in the CPU power profile. Each CPU configuration may be used to support user traffic between the radio access network and one or more user devices.

In step 538, one or more quality of service metrics for the user device are acquired. The one or more quality of service metrics may include a QoS metric for the user device, such as a required threshold network throughput (e.g., a throughput of at least 20 Gbps) or a threshold network latency (e.g., a latency of less than 1 ms). In step 540, a first CPU power profile out of the plurality of CPU power profiles that provides a CPU configuration for the radio access network that satisfies the one or more quality of service metrics for the user device with the lowest power consumption is identified. In some cases, a CPU controller, such as the CPU controller 241 in FIG. 2A, may exhaustively search for and identify a CPU power profile out of plurality of CPU power profiles with the lowest power consumption that is capable of satisfying the one or more quality of service metrics for the user device.

In step 542, the first CPU power profile identified in step 540 is stored. In step 544, the CPU configuration corresponding with the first CPU power profile is applied to the radio access network. The CPU configuration corresponding with the first CPU power profile may be used by the radio access network to instantiate or configure a number of CPUs (or processors) that execute instructions to support the user traffic between the radio access network and the user device. The CPU configuration corresponding with the first CPU power profile may be applied to the radio access network prior to a change (e.g., an increase or decrease) in the number of physical resource blocks used for transmitting data between the radio access network and the user device.

In some embodiments, upon detection of a change in user device traffic between the radio access network and the user device, a CPU controller may adjust CPU power via application of the first CPU power profile before a PRB controller assigns a change in the number of physical resource blocks used for transmitting data between the radio access network and the user device.

At least one embodiment of the disclosed technology includes a storage device configured to store a threshold queueing delay and one or more processors in communication with the storage device. The one or more processors configured to determine an average queuing delay for data transmissions between a radio access network and a user device during a first time period, detect that the average queuing delay is greater than the threshold queuing delay, and adjust a number of physical resource blocks used for the data transmissions between the radio access network and the user device in response to detection that the average queuing delay is greater than the threshold queuing delay.

At least one embodiment of the disclosed technology includes determining an average queuing delay for data transmissions associated with a radio access network during a first time period, detecting that the average queuing delay is greater than a threshold queuing delay, and adjusting or increasing a number of physical resource blocks used for the data transmissions associated with the radio access network in response to detecting that the average queuing delay is greater than the threshold queuing delay.

At least one embodiment of the disclosed technology includes computing an average queuing delay for data transmissions associated with a radio access network during a first time period, detecting that the average queuing delay is greater than a threshold queuing delay, detecting that a queue size of a queue used for the data transmissions associated with the radio access network has grown since a prior decision time interval prior to the first time period, detecting that the number of physical resource blocks should be increased in response to detection that the queue size of the queue has grown since the prior decision time interval prior to the first time period and that that the average queuing delay is greater than the threshold queuing delay, and increasing the number of physical resource blocks used for the data transmissions associated with the radio access network.

At least one embodiment of the disclosed technology includes a storage device configured to store a plurality of CPU power profiles and one or more processors in communication with the storage device. The storage device storing thereon computer-executable instructions, that, when executed by the one or more processors, cause the system to perform operations comprising detecting a change in user device traffic between the radio access network and a user device, determining a number of physical resource blocks for transmitting data between the radio access network and the user device, acquiring a quality of service metric for the user device traffic between the radio access network and the user device, identifying a first CPU power profile out of the plurality of CPU power profiles that provides a CPU configuration for the radio access network that satisfies the quality of service metric given the number of physical resource blocks with the lowest power consumption, and configuring the radio access network using the first CPU power profile.

At least one embodiment of the disclosed technology includes detecting a change in user device traffic between a radio access network and a user device, determining a number of physical resource blocks for transmitting data between the radio access network and the user device subsequent to detecting the change in the user device traffic between the radio access network and the user device, acquiring a network latency requirement for the user device, identifying a first CPU power profile out of the plurality of CPU power profiles that provides a CPU configuration for the radio access network with the lowest power consumption that satisfies the network latency requirement for the user given the number of physical resource blocks, storing the first CPU power profile, and configuring the radio access network using the first CPU power profile.

At least one embodiment of the disclosed technology includes a storage device configured to store a plurality of CPU power profiles and one or more processors in communication with the storage device. The one or more processors configured to detect an increase in user device traffic between the radio access network and a user device, determine a number of physical resource blocks for transmitting data between the radio access network and the user device in response to detection of the increase in the user device traffic between the radio access network and the user device, acquire a quality of service metric for the user device, identify a first CPU power profile out of the plurality of CPU power profiles that provides a CPU configuration for the radio access network with the lowest power consumption that satisfies the quality of service metric for the user device given the number of physical resource blocks, and configure the radio access network using the first CPU power profile.

In some cases, the one or more processors may be configured to apply the first CPU power profile to the radio access network prior to an increase in the number of physical resource blocks used for transmitting data between the radio access network and the user device.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each step in a flowchart may correspond with a program module or portion of computer program code, which may comprise one or more computer-executable instructions for implementing the specified functionality. In some implementations, the functionality noted within a step may occur out of the order noted in the figures. For example, two steps shown in succession may, in fact, be executed substantially concurrently, or the steps may sometimes be executed in the reverse order, depending upon the functionality involved. In some implementations, steps may be omitted and other steps added without departing from the spirit and scope of the present subject matter. In some implementations, the functionality noted within a step may be implemented using hardware, software, or a combination of hardware and software. As examples, the hardware may include microcontrollers, microprocessors, field programmable gate arrays (FPGAs), and electronic circuitry.

For purposes of this document, the term "processor" may refer to a real hardware processor or a virtual processor, unless expressly stated otherwise. A virtual machine may include one or more virtual hardware devices, such as a virtual processor and a virtual memory in communication with the virtual processor.

For purposes of this document, it should be noted that the dimensions of the various features depicted in the figures may not necessarily be drawn to scale.

For purposes of this document, reference in the specification to "an embodiment," "one embodiment," "some embodiments," "another embodiment," and other variations thereof may be used to describe various features, functions, or structures that are included in at least one or more embodiments and do not necessarily refer to the same embodiment unless the context clearly dictates otherwise.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify or distinguish separate objects.

For purposes of this document, the term "set" of objects may refer to a "set" of one or more of the objects.

For purposes of this document, the phrases "a first object corresponds with a second object" and "a first object corresponds to a second object" may refer to the first object and the second object being equivalent, analogous, or related in character or function.

For purposes of this document, the term "or" should be interpreted in the conjunctive and the disjunctive. A list of items linked with the conjunction "or" should not be read as requiring mutual exclusivity among the items, but rather should be read as "and/or" unless expressly stated otherwise. The terms "at least one," "one or more," and "and/or," as used herein, are open-ended expressions that are both conjunctive and disjunctive in operation. The phrase "A and/or B" covers embodiments having element A alone, element B alone, or elements A and B taken together. The phrase "at least one of A, B, and C" covers embodiments having element A alone, element B alone, element C alone, elements A and B together, elements A and C together, elements B and C together, or elements A, B, and C together. The indefinite articles "a" and "an," as used herein, should typically be interpreted to mean "at least one" or "one or more," unless expressly stated otherwise.

The various embodiments described above can be combined to provide further embodiments. All of the U.S. patents, U.S. patent application publications, and U.S. patent applications referred to in this specification and/or listed in the Application Data Sheet are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The disclosure presented herein also encompasses the subject matter set forth in the following clauses:

Clause 1: A system, comprising:

a storage device configured to store a threshold queueing delay; and one or more processors in communication with the storage device, the storage device storing thereon computer-executable instructions, that, when executed by the one or more processors, cause the system to perform operations comprising:

determining an average queuing delay for data transmissions between a radio access network and a user device during a first time period;

detecting that the average queuing delay is greater than the threshold queuing delay; and adjusting a number of physical resource blocks used for the data transmissions between the radio access network and the user device in response to detection that the average queuing delay is greater than the threshold queuing delay.

Clause 2: The system of clause 1, further comprising computer-executable instructions, that, when executed by the one or more processors, cause the system to perform operations comprising increasing the number of physical resource blocks used for the data transmissions between the radio access network and the user device.

Clause 3: The system of any of clauses 1-2, further comprising computer-executable instructions, that, when executed by the one or more processors, cause the system to perform operations comprising:

detecting that a queue size of a queue used for the data transmissions between the radio access network and the user device has grown since a prior decision time interval prior to the first time period.

Clause 4: The system of any of clauses 1-3, further comprising computer-executable instructions, that, when executed by the one or more processors, cause the system to perform operations comprising:

detecting that the number of physical resource blocks should be increased in response to detection that the queue size of the queue has grown since the prior decision time interval prior to the first time period.

Clause 5: The system of any of clauses 1-4, further comprising computer-executable instructions, that, when executed by the one or more processors, cause the system to perform operations comprising:

detecting that a queue size of a queue used for the data transmissions between the radio access network and the user device has not grown since a prior decision time interval prior to the first time period.

Clause 6: The system of any of clauses 1-5, further comprising computer-executable instructions, that, when executed by the one or more processors, cause the system to perform operations comprising:

detecting that the number of physical resource blocks should be decreased in response to detection that the queue size of the queue has not grown since the prior decision time interval prior to the first time period.

Clause 7: The system of clauses 1-6, further comprising computer-executable instructions, that, when executed by the one or more processors, cause the system to perform operations comprising:

detecting that the queue size of the queue has reduced since the prior decision time interval prior to the first time period.

Clause 8: The system of any of clauses 1-7, further comprising computer-executable instructions, that, when executed by the one or more processors, cause the system to perform operations comprising:

increasing the number of physical resource blocks in an additive manner in response to detection that the average queuing delay is greater than the threshold queuing delay.

Clause 9: The system of any of clauses 1-8, wherein:

the one or more processors are configured to determine the number of physical resource blocks using reinforcement learning techniques.

Clause 10: The system of any of clauses 1-9, determining the number of physical resource blocks via application of reinforcement learning techniques to select a physical resource block profile out of a discrete number of physical resource block profiles based on a history of average queueing delays prior to the first time period.

Clause 11: The system of any of clauses 1-10, wherein:

the user device comprises a mobile phone; and the radio access network comprises a virtualized radio access network.

Clause 12: A method for dynamically allocating physical resource blocks (PRBs) by a PRB controller in a virtualized radio access network (vRAN), comprising:

determining an average queuing delay for data transmissions associated with downlink and uplink queues for transmitting data between the vRAN and a user device during a first time period;

detecting that the average queuing delay is greater than a threshold queuing delay; and adjusting a number of PRBs used for the data transmissions between the vRAN and the user device in response to detecting that the average queuing delay is greater than the threshold queuing delay.

Clause 13: The method of clause 12, wherein:

the adjusting the number of PRBs comprises increasing the number of physical resource blocks.

Clause 14: The method of any of clauses 12 and 13, further comprising:

detecting that a queue size of a queue used for the data transmissions between the vRAN and the user device has grown since a prior decision time interval prior to the first time period.

Clause 15: The method of any of clauses 12-14, further comprising:

detecting that the number of PRBs should be increased in response to detecting that the queue size of the queue has grown since the prior decision time interval prior to the first time period.

Clause 16: The method of any of clauses 12-15, further comprising:

detecting that a queue size of a queue used for the data transmissions between the vRAN and the user device has not grown since a prior decision time interval prior to the first time period.

Clause 17: The method of any of clauses 12-16, further comprising:

detecting that the number of PRBs should be decreased in response to detecting that the queue size of the queue has not grown since the prior decision time interval prior to the first time period.

Clause 18: The method of any of clauses 12-17, further comprising:

determining the number of PRBs using reinforcement learning techniques.

Clause 19: The method of any of clauses 12-18, further comprising:

determining the number of PRBs by selecting a PRB profile out of a discrete number of PRB profiles based on a history of average queueing delays prior to the first time period.

Clause 20: One or more storage devices containing processor readable code for configuring one or more processors, wherein the processor readable code configures the one or more processors to:

compute an average queuing delay for data transmissions associated with a radio access network during a first time period;

detect that the average queuing delay is greater than a threshold queuing delay;

detect that a queue size of a queue used for the data transmissions associated with the radio access network has grown since a prior decision time interval prior to the first time period;

detect that a number of physical resource blocks should be increased in response to detection that the queue size of the queue has grown since the prior decision time interval prior to the first time period and that the average queuing delay is greater than the threshold queuing delay; and increase the number of physical resource blocks used for the data transmissions associated with the radio access network.

The disclosure presented herein also encompasses the subject matter set forth in the following clauses:

Clause 21: A system for optimizing power consumption of a radio access network, comprising:

a storage device configured to store a plurality of CPU power profiles; and one or more processors in communication with the storage device, the storage device storing thereon computer-executable instructions, that, when executed by the one or more processors, cause the system to perform operations comprising:

detecting a change in user device traffic between the radio access network and a user device;

determining a number of physical resource blocks for transmitting data between the radio access network and the user device;

acquiring a quality of service metric for the user device traffic between the radio access network and the user device;

identifying a first CPU power profile out of the plurality of CPU power profiles that provides a CPU configuration for the radio access network that satisfies the quality of service metric given the number of physical resource blocks with the lowest power consumption; and configuring the radio access network using the first CPU power profile.

Clause 22: The system of clause 21, further comprising computer-executable instructions, that, when executed by the one or more processors, cause the system to perform operations comprising:

configuring the radio access network using the first CPU power profile prior to an increase in the number of physical resource blocks used for transmitting data between the radio access network and the user device.

Clause 23: The system of any of clauses 21-22, further comprising computer-executable instructions, that, when executed by the one or more processors, cause the system to perform operations comprising:

detecting an increase in user device traffic between the radio access network and the user device; and determining the number of physical resource blocks for transmitting data between the radio access network and the user device in response to detecting the increase in user device traffic between the radio access network and the user device.

Clause 24: The system of any of clauses 21-23, the quality of service metric for the user device traffic between the radio access network and the user device comprises a threshold network latency for data transmissions between the radio access network and the user device.

Clause 25: The system of any of clauses 21-24, further comprising computer-executable instructions, that, when executed by the one or more processors, cause the system to perform operations comprising:

detecting a reduction in user device traffic between the radio access network and the user device; and configuring the radio access network using the first CPU power profile after a reduction in the number of physical resource blocks used for transmitting data between the radio access network and the user device.

Clause 26: The system of any of clauses 21-25, wherein:

the radio access network comprises a virtualized radio access network;

the storage device comprises a semiconductor memory; and the user device comprises a mobile phone.

Clause 27: The system of clauses 21-26, wherein:

the first CPU power profile specifies a number of CPU cores and corresponding CPU frequencies for each of the CPU cores.

Clause 28: The system of any of clauses 21-27, further comprising computer-executable instructions, that, when executed by the one or more processors, cause the system to perform operations comprising:

identifying the first CPU power profile out of the plurality of CPU power profiles by exhaustively searching the plurality of CPU power profiles for a CPU profile with the lowest power consumption that is capable of satisfying the quality of service metric for the user device traffic between the radio access network and the user device.

Clause 29: A method for adjusting power consumption of a radio access network, comprising:

detecting a change in user device traffic between the radio access network and a user device;

determining a number of physical resource blocks for transmitting data between the radio access network and the user device subsequent to detecting the change in the user device traffic between the radio access network and the user device;

acquiring a network latency requirement for the user device;

identifying a first CPU power profile out of a plurality of CPU power profiles that provides a CPU configuration for the radio access network with the lowest power consumption that satisfies the network latency requirement for the user device given the number of physical resource blocks;

storing the first CPU power profile; and configuring the radio access network using the first CPU power profile.

Clause 30: The method of clause 29, wherein:

the configuring the radio access network using the first CPU power profile is performed prior to an increase in the number of physical resource blocks for transmitting data between the radio access network and the user device.

Clause 31: The method of any of clauses 29 and 30, wherein:

the detecting the change in user device traffic between the radio access network and the user device includes detecting an increase in the user device traffic between the radio access network and the user device.

Clause 32: The method of any of clauses 29-31, further comprising:

detecting a reduction in user device traffic between the radio access network and the user device; and configuring the radio access network using the first CPU power profile after a reduction in the number of physical resource blocks used for transmitting data between the radio access network and the user device.

Clause 33: The method of any of clauses 29-32, wherein: the radio access network comprises a virtualized radio access network.

Clause 34: The method of any of clauses 29-33, wherein: the first CPU power profile specifies a set of CPU cores and corresponding CPU core frequencies.

Clause 35: The method of any of clauses 29-34, wherein: the identifying the first CPU power profile out of the plurality of CPU power profiles includes identifying the first CPU power profile by exhaustively searching the plurality of CPU power profiles for a CPU profile with the lowest power consumption that is capable of satisfying the network latency requirement for the user device.

Clause 36: A system for optimizing power consumption of a radio access network, comprising:

a storage device configured to store a plurality of CPU power profiles; and one or more processors in communication with the storage device configured to:

detect an increase in user device traffic between the radio access network and a user device;

determine a number of physical resource blocks for transmitting data between the radio access network and the user device in response to detection of the increase in the user device traffic between the radio access network and the user device;

acquire a quality of service metric for the user device;

identify a first CPU power profile out of the plurality of CPU power profiles that provides a CPU configuration for the radio access network with the lowest power consumption that satisfies the quality of service metric for the user device given the number of physical resource blocks; and configure the radio access network using the first CPU power profile.

Clause 37: The system of clause 36, wherein:

the one or more processors are configured to apply the first CPU power profile to the radio access network prior to an increase in the number of physical resource blocks used for transmitting data between the radio access network and the user device.

Clause 38: The system of any of clauses 36-37, wherein: the quality of service metric for the user device comprises a maximum network latency for data transmissions between the radio access network and the user device.

Clause 39: The system of any of clauses 36-38, wherein: the radio access network comprises a virtualized radio access network; and the first CPU power profile specifies a number of CPU cores and their corresponding CPU frequencies.

Clause 40: The system of any of clauses 36-39, wherein: the one or more processors are configured to identify the first CPU power profile out of the plurality of CPU power profiles by exhaustively searching the plurality of CPU power profiles for a CPU profile with the lowest power consumption that is capable of satisfying the quality of service metric for the user device.

The invention claimed is:

1. A system for optimizing power consumption of a radio access network, 1. comprising:

a storage device configured to store a plurality of CPU power profiles; and one or more processors in communication with the storage device, the storage device storing thereon computer-executable instructions, that, when executed by the one or more processors, cause the system to perform operations comprising:

detecting a change in user device traffic between the radio access network and a user device;

determining a number of physical resource blocks for transmitting data between the radio access network and the user device;

acquiring a quality of service metric for the user device traffic between the radio access network and the user device;

identifying a first CPU power profile out of the plurality of CPU power profiles that provides a CPU configuration for the radio access network that satisfies the quality of service metric given the number of physical resource blocks with the lowest power consumption; and configuring the radio access network using the first CPU power profile.

2. The system of claim 1, further comprising computer-executable instructions, that, when executed by the one or more processors, cause the system to perform operations comprising:

configuring the radio access network using the first CPU power profile prior to an increase in the number of physical resource blocks used for transmitting data between the radio access network and the user device.

3. The system of claim 1, further comprising computer-executable instructions, that, when executed by the one or more processors, cause the system to perform operations comprising:

detecting an increase in user device traffic between the radio access network and the user device; and determining the number of physical resource blocks for transmitting data between the radio access network and the user device in response to detecting the increase in user device traffic between the radio access network and the user device.

4. The system of claim 1, wherein:

the quality of service metric for the user device traffic between the radio access network and the user device comprises a threshold network latency for data transmissions between the radio access network and the user device.

5. The system of claim 1, further comprising computer-executable instructions, that, when executed by the one or more processors, cause the system to perform operations comprising:

detecting a reduction in user device traffic between the radio access network and the user device; and configuring the radio access network using the first CPU power profile after a reduction in the number of physical resource blocks used for transmitting data between the radio access network and the user device.

6. The system of claim 1, wherein:

the radio access network comprises a virtualized radio access network;

the storage device comprises a semiconductor memory; and the user device comprises a mobile phone.

7. The system of claim 1, wherein:

the first CPU power profile specifies a number of CPU cores and corresponding CPU frequencies for each of the CPU cores.

8. The system of claim 1, further comprising computer-executable instructions, that, when executed by the one or more processors, cause the system to perform operations comprising:

identifying the first CPU power profile out of the plurality of CPU power profiles by exhaustively searching the plurality of CPU power profiles for a CPU profile with the lowest power consumption that is capable of satisfying the quality of service metric for the user device traffic between the radio access network and the user device.

\* \* \* \* \*